United States Patent
Arivukkarasu et al.

(10) Patent No.: US 10,909,576 B1
(45) Date of Patent: Feb. 2, 2021

(54) VIRTUAL ENVIRONMENT CREATION, SCALING, AND POPULATION WITH MULTIPLE DISPLAY OPPORTUNITIES

(71) Applicant: Sprint Communications Company L.P., Overland Park, KS (US)

(72) Inventors: Anand Arivukkarasu, San Francisco, CA (US); Robert H. Burcham, Overland Park, KS (US); Jason R. Delker, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 782 days.

(21) Appl. No.: 14/872,992

(22) Filed: Oct. 1, 2015

(51) Int. Cl.
G06Q 30/02 (2012.01)

(52) U.S. Cl.
CPC .................. *G06Q 30/0269* (2013.01)

(58) Field of Classification Search
CPC ........................................ G06Q 30/0207–0277
See application file for complete search history.

(56) References Cited

U.S. PATENT DOCUMENTS

2006/0036513 A1* 2/2006 Whatley ................ G06Q 30/06
705/26.1
2012/0109737 A1* 5/2012 Setty .................. G06O 30/0242
705/14.41
2013/0073420 A1* 3/2013 Kumm ............... G06Q 30/0601
705/26.5
2017/0323306 A1* 11/2017 Kusumoto ............. G06Q 30/02

FOREIGN PATENT DOCUMENTS

WO WO-2015075705 A2 * 5/2015 ............. G06Q 30/06

* cited by examiner

*Primary Examiner* — Chrystina E Zelaskiewicz

(57) ABSTRACT

In an embodiment, a method for providing a virtual environment comprises receiving an input, executing a virtual environment application in response to receiving the input, and generating a display of a virtual environment. The virtual environment comprises a plurality of advertisement locations. The method also includes receiving, from a plurality of advertisement providers, a plurality of advertisements for the plurality of advertisement locations, populating the plurality of advertisement locations with the plurality of advertisements, and displaying the display of the virtual environment having the plurality of advertisements in the plurality of advertisement locations. The method further includes receiving a navigation input, modifying the display to present a different viewpoint within the virtual environment that correlates to a movement within the virtual environment, receiving an ad selection input for an ad of the plurality of advertisements, and displaying advertisement data for the ad.

16 Claims, 9 Drawing Sheets

VIRTUAL ENVIRONMENT CREATION, SCALING, AND POPULATION WITH MULTIPLE DISPLAY OPPORTUNITIES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Advertisements are a beneficial way to promote companies and provide corporations that display advertisements financing that was not available before they displayed the advertisements. An ad presented on a user equipment (e.g., a smart phone) can be displayed while the user equipment is browsing web sites or interacting with other applications. The ads are relatively limited due to the limited space available for presentation such as a banner across a web page or a side bar on the screen, which is already somewhat limited due to the reduced display area generally available on a user equipment. Due to the limited size, most ads feature a limited number of products for a single company. When an advertisement is displayed on the user equipment, the display can be referred to as an ad experience. Presenting ads on the user equipment is an opportunity for wireless service providers to capture revenue from advertisers who will pay for ad experiences. Thus, ad experiences may be counted and reported by the user equipment to the wireless service provider in order for the provider to draw revenue from advertisers.

SUMMARY

In an embodiment, a method for providing a virtual environment comprises receiving an input on a user equipment, executing, by a processor, a virtual environment application in response to receiving the input, and generating, by the processor, a display of a virtual environment. The virtual environment comprises a plurality of advertisement locations. The method also includes receiving, from a plurality of advertisement providers, a plurality of advertisements for the plurality of advertisement locations, populating the plurality of advertisement locations with the plurality of advertisements, and displaying, on a display of the user equipment, the display of the virtual environment having the plurality of advertisements in the plurality of advertisement locations. The method further includes receiving, at the user equipment, a navigation input, modifying the display to present a different viewpoint within the virtual environment that correlates to a movement within the virtual environment, receiving, at the user equipment, an ad selection input for an ad of the plurality of advertisements, and displaying, on the display of the user equipment, advertisement data for the ad.

In an embodiment, a method of reproducing a real environment as a virtual environment comprises receiving an input on a user equipment, executing, by a processor, a virtual environment application in response to receiving the input, and receiving, by the virtual environment application, an image of a real environment. The real environment comprises a spatial layout comprising one or more walls, a floor, and a plurality of objects. The method also includes detecting, by the virtual environment application, the one or more walls, the floor, and the plurality of objects the plurality of objects within the image, determining a relative placement of the plurality of objects within the real environment based on the image, and generating, by the virtual environment application, a display of a virtual environment. A spatial layout of the virtual environment corresponds to the spatial layout of the real environment. The method also includes replacing, by the virtual environment application, at least one of the one or more of the plurality of objects with an advertisement within the virtual environment, displaying, by the virtual environment application, the virtual environment on the user equipment, receiving, at the user equipment, an ad selection input for an ad of the plurality of advertisements, and displaying, on the display of the user equipment, advertisement data for the ad.

In an embodiment, a method for providing a virtual environment comprises receiving an input on a user equipment, executing, by a processor, a virtual environment application in response to receiving the input, and retrieving, by the virtual environment application from a policy store portion of a memory, a set of policies. The set of policies define rules for selecting a virtual environment template. The method also includes retrieving, by the virtual environment application from a profile store portion of the memory, profile information for a user of the user equipment, applying the set of policies to the profile information, and selecting a template from a plurality of virtual environment templates based on applying the set of policies to the profile information. The method further includes retrieving, by the virtual environment application from a policy store portion of the memory, an advertisement policy rule set that defines a relationship between one or more types of ads and at least one of the template or the profile information, applying the advertisement policy rule set to the template and the profile information, selecting a plurality of ads based on applying the advertisement policy rule set to the template and the profile information, generating, by the virtual environment application, a display of a virtual environment using the template, populating the virtual environment with the plurality of ads, displaying, by the virtual environment application, the virtual environment on the user equipment, receiving, at the user equipment, an ad selection input for an ad of the plurality of advertisements, and displaying, on the display of the user equipment, advertisement data for the ad.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
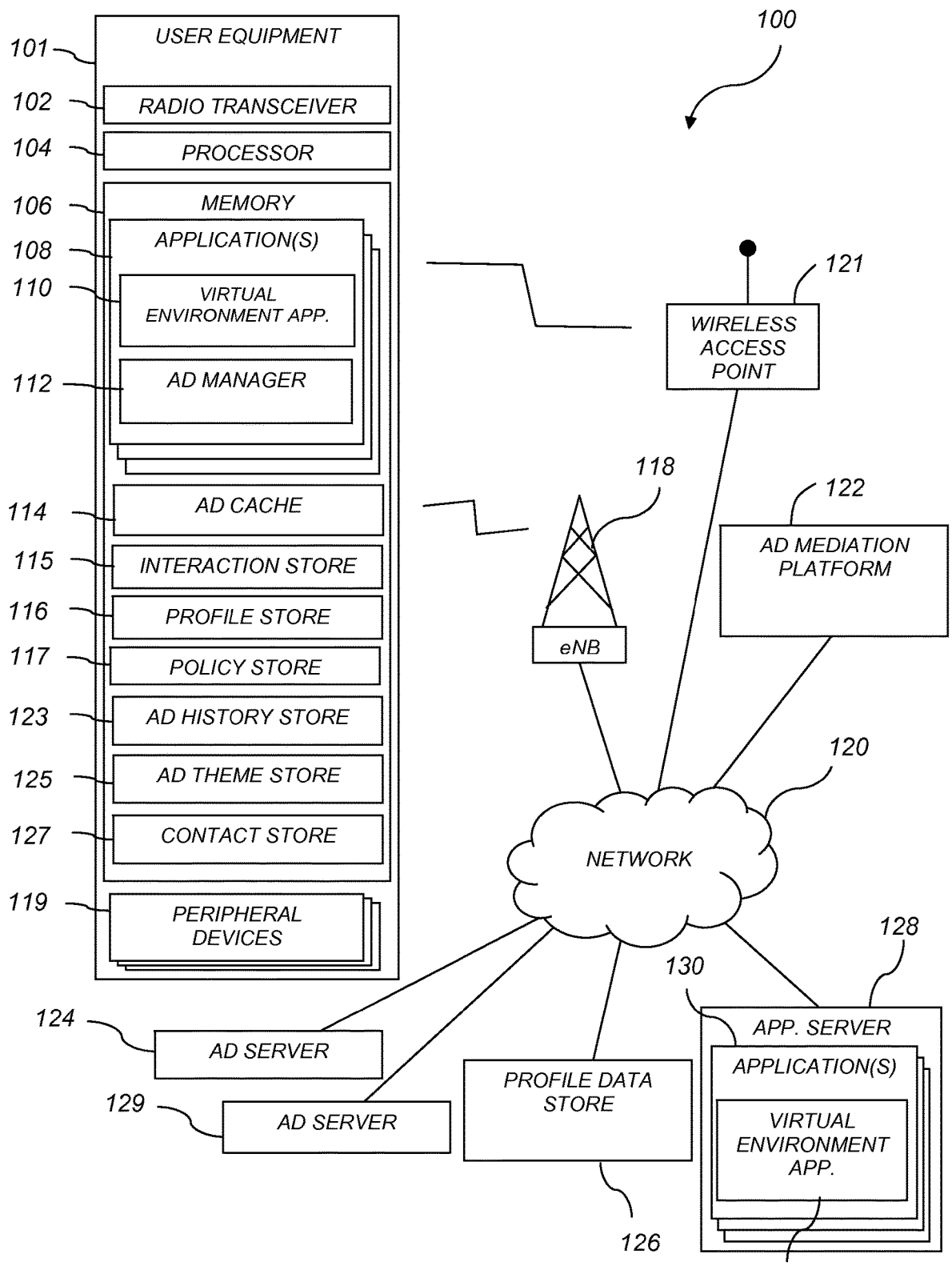
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A display of ads on an electronic device generally allows for a limited amount of interaction and feedback to a communication service provider. In some instances, the ads are provided by advertisement providers, which pay the communication service provider for displaying the ad. The communication service provider can be paid for displaying an ad and/or for those ads that a user selects. In order to be paid for click-throughs, (e.g., those ads actively selected by the users), various feedback and tracking mechanisms can be used. For example, the selection of an ad can result in the request for information, which can serve as an indication that the ad was selected. The additional information can be supplied by redirecting the user to the advertiser's website and/or a manufacturer's website. In any event, the user is generally directed away from a communication service provider once the ad is selected. This may limit the information available to the communication service provider about the user's interactions with the ad as well as limiting the communication service provider's opportunities to charge for the ads.

Disclosed herein is a system and process for generating and presenting a virtual environment on a display of a user equipment including a plurality of display locations that may be used to display ads. The virtual environment may simulate a real environment and allow a user to navigate through the environment to interact with various items and the ads. The virtual environment may be provided as an instance of an application executing on the user equipment, a server computer, or a combination of both. The immersive environment may provide feedback to entice a user to remain in the virtual environment while interacting with multiple ads provided from different advertisement providers. For example, the virtual environment may appear as a living room in a house. The living room may have furniture and items within the environment. Ads can include interactive items, displays, and the like. In some embodiments, the ads may share a common theme.

A user interacting with the virtual environment may view multiple items from different advertisement providers. When an ad is selected, advertisement information can be displayed within the virtual environment rather than linking to an external site. The virtual environment can provide a purchase transaction process to allow a user to buy an item or service from within the virtual environment. This may be integrated with a customer account to allow the payment to proceed directly through the communication service provider. Overall, the system helps to retain the user within the virtual environment where the user's interactions with the environment can be monitored and recorded. This interaction information can then be used to refine the virtual environment and the ads presented to the user. The customization of the environment may allow ads of interest to the user to be displayed to increase the chances that the ads will be selected by the user. By retaining the user within the virtual environment, the communication service provider may have more opportunities to charge for the ads as well as collect additional information about the user. From the user's perspective, the virtual environment may provide a single location to shop and compare items that are selected based on the user's particular taste along with a purchase mechanism to allow any selected items to be easily purchased.

The virtual environment can be created by the application based on the information about the user. This can include a fully automated virtual environment creation mechanism based on past information. If no information is available, then a generic template or any other theme can be selected as a starting point. In some embodiments, templates can be used to create the virtual environment. The templates can define various themes as well as the types of ads and their positioning within the virtual environment.

In other embodiments, a user may be able to create a virtual environment using their own, real environment as a template. In this case, the user may supply an image or other input to allow the real environment to be virtually reproduced. Various rules can be used to identify items within the real environment to provide the corresponding layout as well as properly placing ads within the virtual representation of the real environment. For example, image recognition routines can be used to identify various items in an image of a real environment. The recognized items can be used for scaling as well as replacement points for display locations. The overall layout of the virtual environment may match the user's supplied image, which may increase the user's interest in interacting with the virtual environment, and the items displayed within the virtual environment.

The virtual environment can be generated for the user in a number of ways. For example, the virtual environment can be generated by a dedicated application executed on a user equipment associated with the user. In other embodiments, the virtual environment application can execute on a network component and provide the information to render the display of the virtual environment over a network connection. The resulting virtual environment can be displayed on the entire display of the user equipment, within another display, or a portion of the display. For example, the virtual environment can appear as a banner ad in a separate web page. Alternatively, the virtual environment may appear as an advertisement prior to allowing a user to access a requested web page. In some embodiments, the virtual environment application may allow the display to be migrated to a different portion of the display, or another display entirely. For example, a virtual environment being displayed on a mobile device may be migrated to a full computer monitor to allow a larger and more detailed image to be presented.

Turning now to FIG. 1, a communication system 100 is described. In an embodiment, the system 100 comprises a user equipment 101. In some contexts, the user equipment 101 may be referred to as a mobile electronic device or a mobile communication device. The user equipment 101 may comprise a radio transceiver 102, a processor 104, and a memory 106. The memory 106 of the user equipment 101 may further comprise a plurality of applications 108 including a virtual environment application 110 and an ad manager 112. In some embodiments, the ad manager 112 may be a portion of the virtual environment application 110. The memory 106 of the user equipment 101 may further comprise an ad cache 114, an interaction store 115, a profile store 116, a policy store 117, an ad history store 123, an ad theme store 125, and/or a contact store 127. One or more peripheral devices 119 such as a display, input devices (e.g., a touch screen, keys, microphone, accelerometer, etc.), and the like can also be present in the user equipment 101. The virtual environment application 110 provides a display of a virtual environment providing for a plurality of ad presentation slots on a display of the user equipment 101. While illustrated as comprising a plurality of applications and stores, a user equipment 101 may, in some embodiments, comprise less than all of the applications and/or stores illustrated in FIG. 1. In some embodiments, the user equipment 101 may comprise applications and/or stores in addition to the applications and/or stores illustrated in FIG. 1.

In an embodiment, the user equipment 101 may be configured to generate and display a virtual environment. A virtual environment generally comprises a simulated environment generating a three-dimensional graphical display. Through the appropriate inputs, a user can manipulate the display to readjust the vantage point within the three dimensional environment. For example, the display may be adjusted to simulate movement within the environment. Sensory experiences can also be simulated including touching and interacting with object or elements of the environment. The virtual environment can simulate a real environment and location in which a plurality of objects or elements serves as advertisement locations. In some embodiments, the advertisement locations can comprise banners, displays, or the like within the virtual environment.

Figure 2:
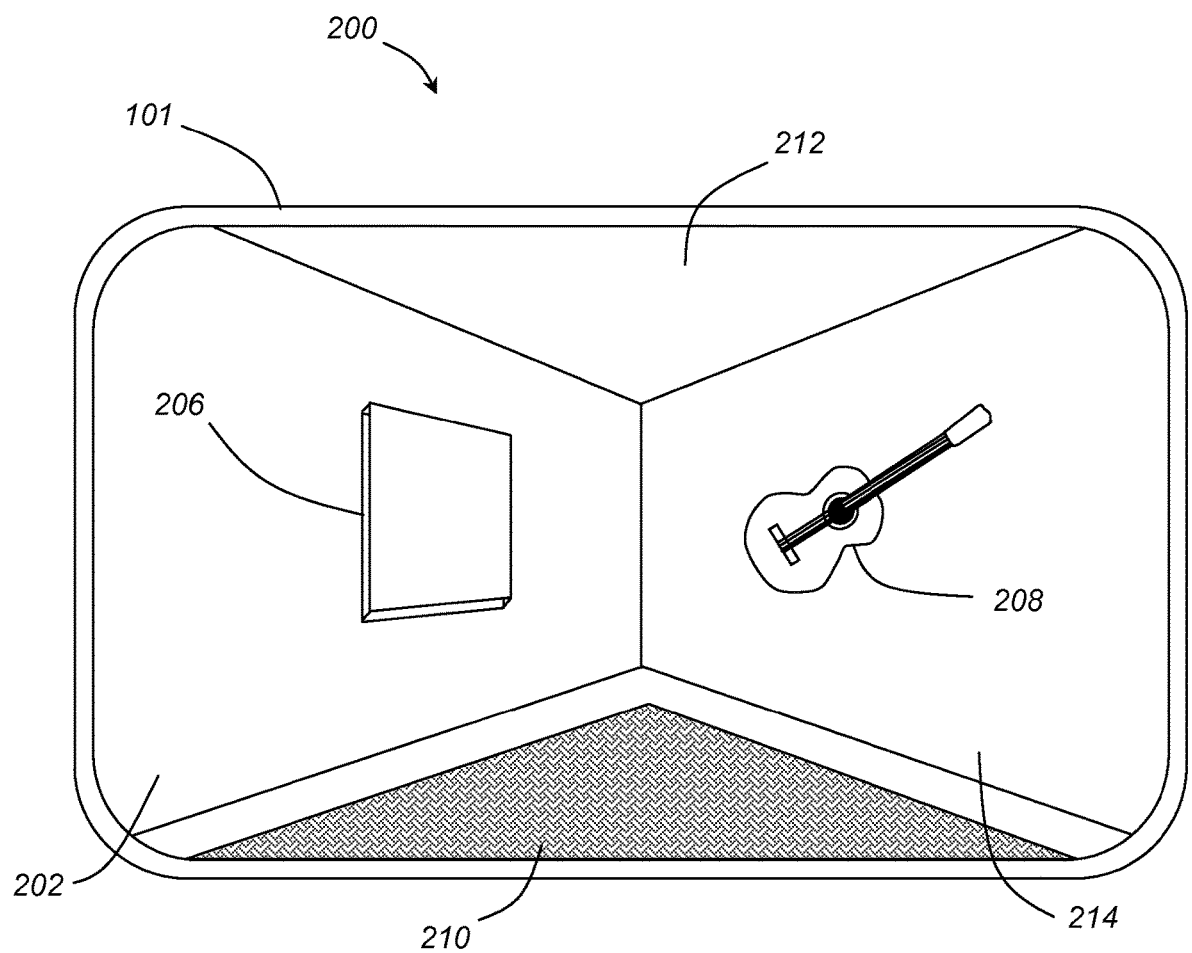
FIG. 2 illustrates a user equipment and exemplary display screens according to an embodiment of the disclosure.

An exemplary and schematic view of a display generated by the virtual environment is illustrated in FIG. 2. As shown, the user equipment 101 has a display upon which the virtual environment 200 can be presented. As illustrated, the virtual environment 200 can include a plurality of walls 202, 214, a ceiling 212, and a floor 204. Objects can be simulated in the virtual environment 200. For example, a first advertisement location 206 may include a painting, a poster, or simply a surface on the wall 202. A second advertisement location 208 may include an object disposed on the second wall 214. For example, a guitar can be simulated as being mounted on the second wall 214. The virtual environment 200 may also include a third advertisement location 210 on the floor. For example, a rug or other structure or element may be an ad location. While three ad locations are illustrated, any number of ad locations can be included in the virtual environment.

As an interactive environment, more than one room can be present within the virtual environment. As a user moves through the environment, each room may have one or more ad locations. While illustrated as specific advertisement examples, any number of advertisement locations and types can be present in the virtual environment. The virtual environment may allow for one or more inputs. For example, an input device such as a keyboard, mouse, touch screen or the like may accept one or more inputs to allow for the perspective of the viewer to move throughout the environment. One or more input points may be associated with each advertisement location in the virtual environment. When an input is provided for the advertisement location, various actions may occur to provide an interaction with the advertisement, as described in more detail herein. The use of the virtual environment may provide feedback including an indication of the number of inputs needed to access an ad. For example, an ad may only be accessed after navigating through the virtual environment and selecting the ad. This type of interaction may provide a good indication that the user is engaged with the environment and did not accidentally select the ad.

The use of the interactive virtual environment may allow the user to interact with the virtual environment and the ads. The ads can include any type of ads such as static ads (e.g., pictures, text, etc.), motion ads (e.g., applets, flashing text, etc.), video ads (e.g., short video segments such as commercials), objects (e.g., a representation of an item being advertised, etc.), interactive ads, and the like. The ads can be presented within the virtual environment on any surface or as items. For example, static ads, motion ads, and/or video ads can be presented on virtual walls, as virtual posters, on virtual television sets, etc. Ads presented as objects can be placed within the virtual environment and may allow a user to interact with the objects. For example, an ad for a refrigerator may appear as a virtual reproduction of the refrigerator in a virtual environment presented as a kitchen. A user may navigate to the refrigerator to view the refrigerator from various angles, open the refrigerator to view its interior, select the refrigerator to view its features, price, delivery options, and the like. Various interactive ads may allow for the advertised item to be moved within the environment, to be used in the environment, or the like. For example, an advertisement for a car may allow a user to simulate a driving experience from a viewpoint within the vehicle. Any other types of ads that can be virtually displayed can also be used with the virtual environment.

Various types of inputs can be used with the ads in the virtual environment. In an embodiment, the ads may respond to an input on a touch screen, keys, an accelerometer, a microphone, a camera, or some other input or peripheral device(s) 119 of the user equipment 101. For example, a virtual environment comprising a garage with a car, where the items within the garage and the car itself comprise advertisements, may allow a user to initiate a simulated driving experience of the vehicle by touching a touch screen interface of the user equipment 101 or tilting or rotating the user equipment 101 to interact with an accelerometer of the user equipment 101 and thereby drive the simulated vehicle. In this case, the virtual environment application 110 may present images on the display consistent with the steering inputs. Similarly, a virtual environment comprising a beverage on a table may present an image of a glass containing a beverage within the virtual environment. Upon interacting with the beverage within the virtual environment, a user may tilt or otherwise rotating the user equipment 101 to simulate pouring the beverage, thereby providing an input to the accelerometer. In this case, the virtual environment application may present images on the display consistent with pouring the beverage within the virtual environment. The virtual environment application 110 may also allow for other inputs or combinations of inputs for an ad. In an embodiment, a microphone may be used to accept a voice input, a sound, or the like to interact with the ad. In some embodiments, an ad may accept a camera or video input.

The resulting virtual environment may be used to present related items from a plurality of advertisement providers. For example, the ads may be for items that have a common theme, apply to a common demographic group, are used for the same purpose, or the like. As a specific example, a virtual environment may represent a kitchen in a home. The ads may include various kitchen items such as a refrigerator, stove, dish washer, microwave oven, pots, pans, dish soap, and the like. Each of the items may represent ads from different advertisement providers, and due to the diversity of items presented around the kitchen theme, the ads may represent items with different manufacturers. As a result, the virtual environment may represent an advertisement environment that brings together a variety of items in a single location.

In an embodiment, the display of the virtual environment may be displayed across all or a substantial portion of the display on the user equipment 101, which can be referred to as a full screen presentation in some contexts. While illustrated in FIG. 2 as being displayed on the entire display area of a user equipment 101, the virtual environment can also be displayed on a portion of the display. The portion of the display may include an interactive advertisement location associated with another display. For example, web pages may have predefined advertisement locations that can display an advertisement when the page loads. The advertisement location can be displayed in one of the predefined advertisement locations. In some embodiments, the virtual location can be displayed in an advertisement location along an edge of the screen, such as a banner, header, side bar, or the like.

Returning to FIG. 1, the virtual environment application 110 may also monitor the user's interactions with the ad, store the interactions in an interaction store 115, and/or report the interactions to a communication service provider and/or to the advertiser. The ad manager 112 facilitates the selection and loading of the ads into the virtual environment advertisement locations. The ads can be loaded dynamically from an advertisement provider, or in some embodiments, from an ad cache 114. The use of the ad cache 114 may allow for advertisements to be presented without the need for a current communication connection to an outside advertisement provider as well as providing a storage location for a saved virtual environment. The ad manager 112 can base the ad selection on a number of variables including information in a user profile stored in the profile store 116, rules or policies for displaying ads stored in the policy store 117, contextual information, a priority associated with the ad in the ad cache 114, a saved virtual environment and/or ad selection, or any combination thereof, as described in more detail herein. The ad cache 114 contains a plurality of ads that are available on the user equipment 101 for the virtual environment application 110 to display. In an embodiment, the user equipment 101 is one of a mobile phone, a laptop computer, a desktop computer, a notebook computer, a tablet computer, a wearable computer, a headset computer, a personal digital assistant, or a media player. In an embodiment, the user equipment 101 may be implemented as a handset. Details of handsets are discussed further hereinafter.

The system 100 may further comprise an enhanced node B(eNB) 118, a wireless access point 121, and a network 120. The network 120 may be communicatively coupled to an ad mediation platform 122, a plurality of advertisement provider ad servers 124, 129, a profile data store 126, and an application server 128. The application server 128 may store applications 130 for use with the user equipment 101 such as the virtual environment application 132. In an embodiment, the eNB 118 may provide a wireless communication link to the user equipment 101 and communicatively couple it to the network 120. In an embodiment, the eNB 118 may provide a wireless communication link to the user equipment 101 according to one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless communication protocol. The wireless access point 121 may communicatively couple the user equipment 101 to the network 120. The wireless access point 121 or other wireless local area network (WLAN) access point may provide a wireless link to the device 101 and/or the network 120. A number of wireless communication protocols may be used including, but not limited to, WiFi, Bluetooth®, and the like. While one user equipment 101 and one eNB 118 are illustrated in FIG. 1, it is understood that the system 100 may comprise any number of user equipments 101 and any number of eNBs 118. The network 120 may be a public communication network, a private communication network, or a combination thereof.

In an embodiment, the ad mediation platform 122 may receive a request from the ad manger 112 to retrieve a plurality of ads. The ad mediation platform 122 may pull a plurality of ads from one or more of the ad servers 124, 129, and send the plurality of ads back to the ad manger 112. In an embodiment, the ad mediation platform 122 may pull information related to a particular subscriber from the profile data store 126 so it can select ads from one or more of the ad servers 124, 129 that are relevant to the subject subscriber's interests. In some embodiments, the ad mediation platform 122 may push the profile information from the profile data store 126 to the profile store 116 in the user equipment 101 for use in selecting ads for display with the virtual environment application 110.

The virtual environment application 110 can provide the virtual environment to a display of the user equipment 101 in a number of ways. First, the virtual environment application 110 can be loaded on the user equipment 101 and executed on the processor 104 of the user equipment 101 to display the virtual environment on the display of the user equipment 101. In some embodiments, the virtual environment application can be executed remotely, for example by being executed on the application server 128 or another network component. The resulting virtual environment can then be communicated to the user equipment 101 for display on a screen or other type of display. In still other embodiments, the virtual environment can be generated on a combination of a remote network element(s) and the user equipment 101. In this embodiment, a network component such as the ad mediation platform 122 may provide advertisement information including a plurality of advertisements and a template for a virtual environment to the user equipment 101 as a part of an HTML page (e.g., a web page), or other communication. The user equipment 101 can then generate the virtual environment within a web page browser using the information provided by the network element.

When the virtual environment application 110 is present on the user equipment 101, the virtual environment application 110 can be loaded on the user equipment 101 in a number of ways. For new user equipment, the virtual environment application 110 can be pre-loaded at the time of manufacturing, deployment, or branding, each of which can occur prior to the user receiving the user equipment 101. For existing devices, the virtual environment application 110 can be obtained from the application server 128, downloaded, and installed on the user equipment 101. The virtual environment application 110 can be obtained as a standalone application, as a package of applications, or the virtual environment application 110 can form a portion of a larger operating system or application operating on the user equipment 101. In some embodiments, the virtual environment application 110 may be downloaded to the user equipment 101 as part of an update to an existing application or operating system. When installed on the user equipment 101, the virtual environment application 110 can operate independently and/or as part of an operating system or application on the user equipment 101.

The virtual environment application 110 can be executed by the processor 104 and operate to perform several functions. The virtual environment application 110 can generate the virtual environment in response to an input initiating the virtual environment application 110, in response to a request for an advertisement for a web page, in response to a selection of an advertisement within a web page, in response to a selection of an advertisement location within a web page or display, or the like. In an embodiment, the virtual environment application 110 may comprise a stand-alone application that can receive an input (e.g., a selection of an icon, or the like) and be initiated to present the virtual environment. In some embodiments, the virtual environment application 110 may be called by a separate application in response to the selection of a web page or an advertisement location within a web page. For example, when a web page or other application is selected, the virtual environment application 110 may be called and initiated to display the virtual environment for a period of time prior to displaying the web page or other application.

The period of time can be predetermined and/or may last until the user interacts to a certain degree with the virtual environment. For example, a user may be required to interact with one advertisement location, two advertisement locations, or the like prior to proceeding past the virtual environment to the selected web page or application. In still other environments, the virtual environment may be displayed as an advertisement within a displayed web page or application. A user can interact with the virtual environment within the advertisement space on the display, which may comprise less than all of the display. In some embodiments, a selection of the virtual environment within an ad location may initiate the virtual environment application 110 as a stand-alone application, and transfer the display to the stand alone application to allow the user to interact with the virtual environment on a larger portion of the display.

When the virtual environment application 110 is initiated, the virtual environment application 110 may generate the display of the virtual environment comprising a plurality of ads and present the ads on the user equipment 101. The selection of the ads may be performed by the ad manager 112, and/or the ad mediation platform 122.

The ad cache 114 may store various ads that can be used to fill one or more of the ad locations within the virtual environment. This may be useful when the user equipment 101 is not in communication with the network 120. The ad cache 114 may comprise a plurality of ads and may comprise more ads than the number of advertisement locations within the virtual environment. This may allow the ad manager 112 to mediate and select the ads for the virtual advertising environment using one or more rules as described in more details below. When the user equipment 101 is in communication with the network 120, the ad mediation platform 122 may select the ads used in the virtual advertising environment. The ads can be selected from one or more of the ad servers 124, 129 and/or from the ad cache 114. While the ads can be provided to the virtual environment application 110 at the time the virtual environment is rendered, the ad mediation platform 122 can select various ads from the ad servers 124, 129 and provide those ads to the ad cache 114 prior to the time they are requested. This may improve the load and rendering time for some ads, including those having relatively large file sizes in light of the communication bandwidth.

The interaction store 115 may be used to record and store the interactions with the virtual environment and/or any ads within the advertisement locations within the virtual environment. Interactions such as movements through the virtual environment, the time spent in the virtual environment, interactions with the ad locations, and the like can be recorded in the interaction store 115. Various other information associated with any inputs and interactions such as the name of the ad, identity of the ad, an interaction timestamp, type of interaction, subscriber or user ID, user equipment ID, or the like may also be recorded in the interaction store 115. The virtual environment application 110 may also record interactions with the ads based on a number of other inputs. In an embodiment, the virtual environment application 110 may record an ad being bookmarked or added to a history of ads, a request to replay an ad from the history or bookmarked list, social sharing of the ad, saving or sharing of the virtual advertising environment, and/or adding the ad, information associated with the ad, or information associated with the subject of the ad to a scheduling or contact application on the user equipment 101. Collectively, this type of information can be referred to as interaction information. When the virtual environment is provided as an HTML presentation on the user equipment 101, the interaction information may be stored as cookies. The cookie information can be stored in the user equipment 101 and/or communicated to a network component.

The interaction information can be maintained in the interaction store 115 and/or transmitted to a network location. When the virtual environment application is executed from a network location (e.g., from the application server 128, etc.), the interaction information may be stored on a network element and may not be included in the interaction store 115. In some embodiments, the interaction information may be stored in the interaction store 115 even when the virtual environment application 110 executes on a network element in order to allow the interaction information to be stored in the event of a loss or interruption of communication and/or to allow the information to be transmitted at a later time. For example, the interaction information can be collected in the interaction store 115 and transmitted to a service provider over the network (e.g., to the ad mediation platform 122, the profile data store 126, etc.) after a data session has ended or at off-peak hours.

When a user interacts with the ads within the virtual environment, the ads can be changed, saved, or removed based on the interactions. In order to allow the configuration of the ads and/or the virtual advertisement to be saved for later use, the ads, the virtual environment, and various configuration data can be saved in an ad history store 123. The ad history store 123 can include information on the layout of the virtual environment, the ad locations within the virtual environment, an identification of the ads displayed in each ad location, and the like. The virtual environment application 110 may create a record of the ads displayed that may include an identifier for the ad, a display time, display length, an indication of whether or not the user interacted with the ad, and the like. The history record may be appended to a list of additional ad display history records, or each history record may be maintained separately to allow for version control and recall of the virtual environment as it changes over time. The ad history record may not contain a copy of the virtual environment (e.g., a virtual environment template, or the like) or the ad itself, which may allow the history list to be limited in file size. The ad history store 123 may retain the history records for a certain period of time (e.g., for the last 12 hours, for the last day, the last week, the last month, etc.), for a certain number of interactions with the virtual environment (e.g., the last 10 interactions, the last 20 interactions, the last 50 interactions, the last 100 interactions, etc.), or the like.

In some embodiments, the virtual environment can be saved to allow for the same virtual environment to be reloaded and regenerated at a later time. This feature may be useful to allow a user who would like to view the same virtual environment and/or one or more ads at a later time to access the virtual environment and/or the ad, to allow the user to access a past virtual environment for sharing, and the like. Since the virtual environment and the ads therein may comprise interactive applications, personalized environments and/or ad selections, a user may want to interact with an ad multiple times and/or share the ad with others. For example, a vehicle ad may be selected by a user to represent their own car or a desired car. The user may then want to re-access the ad multiple times to view potential customizations, simulate a driving experience, or the like. In order to access the virtual environment with the ad, the user may select a history list, and the virtual environment application 110 may retrieve the virtual environment comprising the ad. This selection may occur within the history list in the ad history store 123 or the virtual environment application 110 may provide an option to retrieve a past virtual environment. In some embodiments, the virtual environment application 110 may retrieve the most recent virtual environment from the ad history store 123 and regenerate the virtual environment that was previously presented on the display. While the same virtual environment may be regenerated, the ads in the ad locations may change based on various ad mediation rules, as described in more detail herein.

When a previous version of the virtual environment is selected, the selection may be recorded by the virtual environment application 110 as an interaction with the virtual environment. The selection of the virtual environment may be considered an interaction even if no user inputs are received during the display of the virtual environment with the plurality of ads. Other interactions such as repeated viewings of the virtual environment and/or an ad within the virtual environment (e.g., repeated within a certain time period, successive views, etc.) may also be recorded as interactions.

In an embodiment, the virtual environment application 110 may be configured to enable a user to share the virtual environment and/or an ad within the virtual environment with another user equipment or user, which may be recorded as an interaction with the ad. When the virtual environment is displayed, the virtual environment application 110 may provide an option to share an ad in an ad location with another user equipment. In response to an input from a user to share the ad, the virtual environment application 110 may generate a message that allows one or more additional user equipments to obtain and view the ad. For example, the ad may be shared with a second user equipment. The identity of the second user equipment can be selected from a contact contained within a contact store 127 or an identity of the second user equipment can be identified through a manual entry process. When the second user equipment does not have the virtual environment application 110, the second user equipment may obtain, install, and activate the virtual environment application 110 in order to view the ad. In this embodiment, the sharing of the ad with the second user equipment may advantageously result in another activation of the virtual environment application 110 that can display more than just the ad shared with the second user equipment.

The sharing of the ad with the second user equipment from within the virtual environment may proceed by various routes. In an embodiment, a message comprising an identifier for the ad, an identifier for the user equipment, and/or additional data associated with the ad, the virtual environment application 110, the virtual environment (e.g., an advertisement theme, layout, etc.), and/or the user equipment may be generated in response to receiving the input indicating that the ad should be shared. The identifying information may be hashed in a header of a message comprising the address of the second user equipment. The message may also comprise the address of the ad mediation platform 122 from which the ad can be obtained and/or the application server 128 from which the virtual environment application 132 can be obtained. The address of the second user equipment may comprise an identifier for the second communication device such as a phone number, mobile ID, or the like. The message may be sent to the second user equipment directly, by providing the message through one or more social sharing websites or applications (e.g., Facebook, Twitter, etc.), by providing the message as an email, by providing the message through a messaging service (e.g., SMS, RSS feed, etc.), or the like. The message may comprise a link or instructions to allow the second user equipment to obtain the ad. When the virtual environment is generated by a network component, the link may comprise a web page link that can be accessed to view the generated virtual environment with the shared ad.

Upon selection of the message (e.g., a link within a message) by the second user equipment, a communication may be generated based on the information within the message. For example, the communication may be sent to the ad mediation platform 122 based on the ad mediation platform address within the message. The communication may identify the ad to be obtained as well as the identifier for the user equipment 101 that originated the sharing request. The communication may allow the virtual environment application 132 to be downloaded and installed to generate the virtual environment for viewing the ad on the second user equipment. In some embodiments, a link to a web page may be sent to the second user equipment to access a web page that displays the virtual environment generated by a remote network component.

The input requesting that an ad within the virtual environment be shared with a second user equipment may be considered an interaction with the virtual environment. This interaction may be recorded by the virtual environment application 110 on the user equipment 101 in the interaction store 115.

The ads selected and presented in the virtual environment can be chosen in a number of ways. In an embodiment, the ad mediation platform 122 can mediate the selection, communication, and presentation of a plurality of ads within the virtual environment, where the ads can be obtained from one or more of the ad servers 124, 129. In some embodiments, the ad manager 112 on the user equipment 101 can serve in a similar fashion to mediate the selection of the ads for presentation in the virtual environment. The choice between using the ad mediation platform 122, the ad manager 112 on the user equipment 101, or a combination of both may be based, among other factors, on the execution location of the virtual environment application 110, the location from which the ad or ads are obtained, and/or the available bandwidth of the communication channel with the user equipment 101.

In some embodiments, the ad manager 112 may be configured to control the selection and presentation of ads within the virtual environment. The selection of the ads can be based on one or more of a profile contained within the profile store 116, rules contained within the policy store 117, past ad information contained within the ad history store 123, and/or interactions with various network components such as the network based profile data store 126 and/or the ad mediation platform 122. The ad selection can also be based on a number of factors including a relative importance of the ads, profile data from the profile data store 126 on the user of the user equipment 101, active advertisement campaigns, and the like.

In an embodiment, the policies may comprise rules for selecting ads based on a demographic group. Each ad may be selected based on one or more demographic characteristics including, but not limited to, one or more of gender, ethnicity, age, financial status, educational level, and interests. The policies can be combined with demographic information by the ad manager 112 and/or the ad mediation platform 122 for a user stored in the profile store 116 and/or obtained from the profile data store 126 through the network 120. When the ads are filtered on the user equipment 101, the demographic data for a user may be pushed from the profile data store 126 to the profile store 116 on the mobile device 101. The profile store 116 can include demographic information specific to the user of the mobile device 101 including, but not limited to, one or more of gender, ethnicity, age, financial status, educational level, and interests.

The policy store 117 may comprise rules established by the communication service provider and/or an advertisement provider for controlling the display of the ads in the virtual environment. The rules may be used in determining ads for a demographic group, determining the frequency at which an ad can be displayed, determining the time during which the ad can be displayed, determining a display based on a priority of the ad, determining a context or theme of the virtual environment in which the ad is displayed, coordinating an ad with an external marketing campaign, and combinations thereof. In some embodiments, the ads can be selected from the ad cache 114 by the ad manager 112 and/or the ad mediation platform 122 on a round robin type selection scheme. However, the application of the policies and profile information by the ad manager 112 and/or the ad mediation platform 122 may result in less than all of the ads being displayed from the ad cache 114 and/or the ads appearing in a different order and/or at a different frequency than the manner in which the ads are stored in the ad cache 114.

When one or more of the ads are stored on the user equipment 101, for example, in the ad cache 114, the ad manager 112 can mediate the loading of one or more of the plurality of ads into the ad cache 114. The ads in the ad cache 114 can be received from the ad mediation platform 122, which may receive the ads from one or more of the ad servers 124, 129. In this embodiment, the ads can be stored in an ad cache 114 rather than being requested each time the virtual environment is rendered by the virtual environment application and requests an ad to avoid overloading the network connections and/or to account for times when the network connectivity is unavailable. Further, rich, multimedia ads can be displayed by the virtual environment application 110 that may include ads having a relatively large file size and may take greater than thirty seconds or a minute to be downloaded over the network 120, which may be an unacceptable delay in presenting the ad in the virtual environment. By placing the ads in the ad cache 114 on the user equipment 101, the ads may be retrieved and presented faster than when they are downloaded at the time they are to be presented from the network 120.

In an embodiment, the ad manager 112 may update the ads in the ad cache 114 by sending a request to the ad mediation platform 122 for a plurality of ads. The ad mediation platform 122 may select a plurality of ads and request the ads from one or more of the ad servers 124, 129. In some embodiments, the ad servers 124, 129 may be associated with third party ad providers and not with the network service provider. Further, while two ad servers 124, 129 are shown, any number of ad servers may be present and can provide ads for use with the ad locations in the virtual environment. The ad mediation platform 122 may then transmit the plurality of ads to the ad manger 112. Upon receiving one or more of the ads, the ad manager 112 can store the ads into the ad cache 114. The ad cache 114 can store a plurality of ads, and the ad cache 114 may store a greater number of ads than the number of ad locations in the virtual environment to allow for the ads to be updated and changed over time. In an embodiment, the ad cache 114 can store at least about 20 ads, at least about 30 ads, at least about 40 ads, at least about 50 ads, or at least about 60 ads.

In an embodiment, the ads may be updated in the ad cache 114. The ads can be updated by being pushed from one or more sources coupled to the network 120, such as by the ad mediation platform 122. The service provider may generate an ad payload comprising one or more ads, and the service provider may send a notification to the user equipment 101 that the ad payload is available for updating the ad cache 114. The user equipment 101 may retrieve the ad payload from the ad server 124, and the ad manager 112 may process the ad payload. The ad manager 112 may retrieve the ad payload based on certain restrains, which are described in more detail herein. In some embodiments, the ad mediation platform 122 may send the ad payload to the user equipment 101 without first sending a notification. The ability of a network element such as the ad mediation platform 122 to initiate the transfer of ads into the ad cache 114 may allow for dynamic updating and display of the ads in the ad locations within the virtual environment. The dynamic updating may allow for ads to be updated based on policies and rules such as new advertising campaigns, targeted ads, and the like to be distributed to a user equipment 101.

The ad manager 112 may also be configured to selectively download ads based on rules stored within the ad mediation platform 122 and/or the policy store 117 within the memory 106 of the user equipment 101. In an embodiment, the application of the rules may identify one or more ads having a higher priority than other ads. The priority can be assigned by the ad mediation platform 122. The ads may be ranked by the communication service provider and/or an advertisement provider, with more important or higher priority ads being given a higher priority value. In some embodiments, the priority of the ads may be determined by a request to share an ad and/or an automatic sharing of the ad. For example, when a second user shares an ad, the ad may be received by the ad manager 112 into the ad cache 114 with a highest level priority so that the ad is displayed within an ad location in the virtual environment when the virtual environment application 110 is activated.

In an embodiment, the ad manager 112 monitors the ads in the ad cache 114 and can selectively replace the ads. In some embodiments, the replacement or modification of the ads may be directed by the ad mediation platform 122. The ads in the ad cache 114 may be replaced based on the number of times the ad is displayed in the virtual environment, a given date or time range, a limited number of interactions with the ad, and the like. When the ad manager 112 determines that an ad should be replaced, it may remove the ad from the ad cache 114 or otherwise remove it from a list of ads being sent to the virtual environment application 110 for display in the virtual environment. The ad manager 112 may then selectively reload the ad cache 114 with one or more additional or replacement ads.

In an embodiment, the ad manager 112 can be configured to apply user profiles and/or policies to select the ads for presentation in the virtual environment. The ad manager 112 may apply one or more policies or rules from the policy store 117 and/or apply one or more rules based on a user profile stored in the profile store 116. The policy store 117 may comprise rules established by the communication service provider and/or an advertisement provider for controlling the display of the ads on the virtual environment display. The rules may be used in determining ads for a demographic group, determining the frequency at which an ad can be displayed, determining the time during which the ad can be displayed, determining a display based on a priority of the ad, determining a context in which the ad is displayed, coordinating an ad with an external marketing campaign, determining ads based on pricing considerations, and combinations thereof. In some embodiments, the ads can be selected from the ad cache 114 on a round robin type selection scheme. However, the application of the policies and profile information may result in less than all of the ads being displayed from the ad cache 114 and/or the ads appearing in a different order and/or at a different frequency than the manner in which the ads are stored in the ad cache 114.

The application of the policies and rules may also determine the location of the ads within the plurality of ad locations in the virtual environment. When the virtual environment is rendered, the viewpoint may originate in a common location or in a location last visited by the user. The ad locations first appearing in the presentation of the virtual environment may have a greater number of views by a user than those requiring the user to explore the virtual environment. As a result, the ad locations within the virtual environment may be ranked using various criteria including being within an initial viewing perspective, size of the ad location, virtual distance from the initial viewing location, and the like with those ads having a greater chance of being viewed being ranked higher. When the ads are prioritized, the higher priority ads can be placed in higher ranking ad locations. In some embodiments, the rules may specify a ranking for an ad in order to have the ad placed in a desired location within the virtual environment.

The application of the policies from the policy store 117 and/or the user profile information from the profile store 116 may occur at or near the time the ads are received from the network 120 and stored in the ad cache 114. In some embodiments, the ad manager 112 may apply the policies and profiles at the time the ad is selected to be sent to the virtual environment application 110. In still other embodiments, the ad manager 112 may apply the policies and profiles between the time the ads are received and stored in the ad cache 114 and the time the ads are sent to the virtual environment application 110.

In some embodiments, the ad selection can be mediated by the ad mediation platform 122. The ad mediation platform 122 may control the selection of the ads when the virtual environment application executes on a network element, or in some embodiments, when the virtual environment application 110 executes on the user equipment 101. The ad mediation platform 122 may utilize the rules and policies in the same manner described above with respect to the ad manager 112 on the user equipment 101. In some embodiments, the ad mediation platform 122 may select advertisements in response to the rendering of the virtual environment. This type of ad selection may be referred to as a real time or near real time selection of ads. As used herein, real time refers to a time that takes into consideration the communication delays and latency between the various network elements and the user equipment 101. For example, real time may refer to providing an ad within about one second, five seconds, ten seconds, within about thirty seconds, within about a minute, or within about two minutes.

In selecting the ads from a plurality of ad servers (e.g., ad server 124, ad server 129, etc.), the ad mediation platform 122 may apply various rules such as those described above to select one or more ads for display in the virtual environment. Further, a user profile stored on the user equipment 101 and/or on a network component can be obtained and applied to the rules to determine the ads provided for the virtual environment. For example, demographic data can be used to select a category of ads targeted for the specific demographic group of the user of the user equipment 101. Further user data such as previous interactions with ads may be used to further narrow the ad selections within the subset selected using the demographic data. One or more ads from the resulting selection can then be selected for placement within the ad locations in the virtual environment.

In some embodiments, real time ad selection may be used with an ad bidding process. In this embodiment, one or more rules can first be applied based on the user profile, a policy store, interaction information, and the like to filter the ads considered for placement within the virtual environment, though this pre-filtering is not necessary. In the bidding process, the ad mediation platform 122 may send a notification to one or more ad servers 124, 129 indicating the number, type, size, and/or context of the ad locations being presented within the virtual environment. The ad servers 124, 129 can then respond with suitable ads and a bid for placing the ad within the ad location. A time limit may be imposed for receiving the bids for the ad placements. Once all of the responses have been received, or when the time limit has ended, the ad mediation platform can select the ad meeting the bidding criteria and, when multiple bids meet the bidding criteria, can select the ad with the highest bid for placement in the ad location. The process may allow the next highest bid to be placed in a second ad location, or a separate bidding process can be conducted for each ad location within the virtual environment. As an ad is awarded for each ad location, the ad or an identification of the ad can be provided to the user equipment 101. When the ad is present in the ad cache 114, an identification of the ad may be provided to the ad manager 112 and/or the virtual environment application 110, which can access the ad cache 114 and place the ad in the corresponding ad location. When the ad is not available on the user equipment 101, the ad mediation platform 122 may mediate obtaining the ad from the corresponding ad server and providing the ad to the virtual environment application 110 on the user equipment 101.

While described in the context of the initial placement of ads in the virtual environment, the real time bidding process can also occur during the display of the virtual environment. In some embodiments, the ad can be replaced while the virtual environment is being displayed. The replacement can occur as a result of an input by the user, a scheduled replacement of the ad, a change in a policy or rule, a change in a theme of the virtual environment, and/or the like.

In some embodiments, the ad manager 112 and the ad mediation platform 122 can both control the selection of the ads for the virtual environment. This may distribute a portion of the processing to the user equipment 101 to save the resources of the ad mediation platform 122 while maintaining at least a portion of the control and real time selection of ads within the network. In this embodiment, the ad mediation platform 122 may perform the selection of one or more ads, or the selection of one or more selection criteria of a group of ads. The various ads or selection criteria can be sent to the user equipment 101 where the ad manager 112 can perform the specific ad selection. For example, the ad mediation platform 122 may perform a bidding process for a group of ads for a time period such as a day or a week. The winning group of ads can be supplied to the user equipment 101 and stored in the ad cache 114 as described herein. Within the time period, the ad mediation platform 122 may then be capable of selecting the ads from within the group of ads and sending the selection or a specific selection criteria to the ad manager 112, which can select the ads for placement in the virtual environment from the ads loaded into the ad cache 114. Prior to or at the end of the time period, the ad mediation platform 122 can rebid the ads and/or provide new selection criteria to the user equipment 101. When new ads are selected, they can replace one or more of the ads in the ad cache 114 for use in future renderings of the virtual environment.

The virtual environment application 110 and/or the ad mediation platform 122 can also be responsible for selecting the layout and configuration of the virtual environment. As described herein, the virtual environment may generally comprise a rendering on a display of a three dimensional environment containing various items and locations for the placement of ads. The virtual environment may provide an opportunity for the user to interact with the environment and the ads located within the virtual environment. In order to encourage a user to interact with the virtual environment, the virtual environment may be selected and configured based on user preferences. In an embodiment, a plurality of templates can be designed with different themes, and a template can be selected for a particular user. In some embodiments, the virtual environment application 110 may allow a user to provide an input to design their own virtual environment. For example, the user may provide an image of their own environment, and the virtual environment application 110 may create a virtual environment corresponding to the image.

In an embodiment, a plurality of templates can be created for the virtual environment. Each template may correspond to a different theme or layout. The templates may be stored in the ad theme store 125, which in some embodiments may be located on a network element. In some embodiments, the templates may be created and stored on a network element and transferred and stored on the user equipment 101 similar to the ads stored in the ad cache 114. This may allow the templates to be present on the user equipment 101 when the virtual environment application 110 executes on the user equipment 101 without the need to transfer a template to the user equipment.

The templates can correspond to various themes. For example, the virtual environment may be configured as a room or rooms in a house such as a living room layout, a bedroom layout, a kitchen layout, a media room layout, a man cave layout, or the like. In some embodiments, the virtual environment template may comprise a plurality of rooms. Other themes or templates can include a garage layout (e.g., with a car or other items), a yard layout, a garden layout, a storefront layout, a green-house layout, a garden layout, a car layout (e.g., an interior and/or exterior car view), an office layout, and/or a layout representing any other suitable physical location. The templates may include data corresponding to virtual layouts comprising items commonly found in these setting. For example, a living room layout or template may comprise a room having tables, chairs, a couch, a television, and the like.

Template rules can also be associated with one or more of the templates. The template rules may define the ad location positions, the placement of items, the available inputs that can be used to interact with the objects in the template, the portability of objects, the ability to change objects, and the like. One or more of the template rules may apply generally to all of the templates while other template rules may be specific to one or more of the template themes. The template rules can be stored in the ad theme store 125 and be applied when the corresponding template is used to render the virtual environment. The template rules may also define the selection criteria of the particular theme based on information in the profile store 116, the policy store 117, the ad history store 123, and/or the interaction store 115. In some embodiments, the template selection rules can be applied when the virtual environment application 110 is first executed. Once the virtual environment is created, the same template may be used each time the virtual environment is generated. The template may then change when an input is received requesting a change. In some embodiments, the template rules can be applied each time the virtual environment is created. This may allow the previous interactions with the virtual environment to be considered each time the virtual environment is created. For example, when a user begins with a garage themed template and only interacts with a car ad in the virtual environment, the interactions may trigger the selection of a car interior as the appropriate template for the next rendering of the virtual environment. Such a feedback mechanism may provide improved interactions for a user with the items and ads, thereby increasing the interactions with the ads in the virtual environment. This may result in more valuable placement of ads in the virtual environment.

In some embodiments, the virtual environment application 110 may allow a user to create a custom virtual environment in a number of ways. For example, a user can use a layout editor to create a custom layout. Alternatively, a user may provide a picture or video (e.g., a plurality of pictures) of a real layout, and the virtual environment application 110 can use the image to match a corresponding template to the layout or create a new layout or template reproducing the real layout.

In an embodiment, a user can create a reproduction of a real layout by selecting a layout creation option. The virtual environment application 110 may then prompt the user for one or more images of the environment. A user can supply an image or images of an environment. The environment may comprise walls, a ceiling, floors, and objects such as items, furniture, and the like. In some embodiments, such as outdoor settings, only a portion of these types of items may be present. The virtual environment application 110 can determine the relative dimensions of the environment, the distance to walls, hallways, and the like using various techniques. In an embodiment, individual items can be detected using image recognition routines. The relative sizes of the items can then be determined to calculate the distance of the items from the imaging device. For example, an individual lamp can be detected. Using average heights of a lamp, the distance of the lamp from the camera can be estimated. Similarly, a standard wall outlet cover may have a height falling within a relatively narrow range. One or more individual wall outlet covers can then be identified in the image, and the relative distance of the walls can then be determined using this estimate. Other measurements can also be estimated using chairs, tables, counters, sofas, and the like in indoor settings. The relative sizes of cars, plants, fences, and the like can be used in other settings. Using the distance measurements, an estimate of the physical layout of the real environment can be determined.

The virtual environment application 110 can then use the individual items that were detected in the image and place corresponding items within the virtual environment being reproduced. The template rules can be used to indicate which types of items should be reproduced and where they can be placed within the room. For example, a recognized item can be compared to a green list containing items that can be reproduced and/or a red list containing items that cannot be reproduced. Once the template rules for the items have been applied, the remaining items can be virtually reproduced in the virtual environment. The template rules may comprise scaling values or factors that can be applied to any of the virtually reproduced items. The scaling rules may specify an item's size based on the location selected within the virtual environment. The scaling rules may also be applied to ads so that the ad, or the item presented as an ad can be scaled properly within the virtual environment. The scaling rules may be based on the dimension determination used to reproduce the real environment.

The ad locations can then be selected within the virtual environment. The ad locations may be selected based on predetermined positions, and/or the ad locations can be dynamically selected based on available positions not occupied by the reproduced items. When more ad locations are needed than a number of available locations, the virtual environment application 110 may relocate or remove one of the virtually reproduced items. The template rules may specify which types of items can be moved and/or removed to make room for the ad locations. In some embodiments, the virtually reproduced items may be used as indicators for the ad locations. For example, a television identified in a living room may be replaced with an ad location for similar items or similarly shaped items. For example, the television on a wall may be replaced with a different television ad and/or an ad for a painting, window, or similar item. The identification and size of the virtually reproduced item from the image may be included in the template rules and used with the ad selection by the ad manager 112 and/or the ad mediation platform 122 in the selection of an appropriate replacement ad. Once the virtual environment that is the reproduction of the real environment is created, it can be stored in the ad theme store 125 for use with the virtual environment application.

In some embodiments, a real environment can be recreated by the virtual environment application 110 using the existing templates stored in the ad theme store 125. In this embodiment, the virtual environment application 110 may analyze the image of the real environment as described above and then select a template best matching the dimensions or relative dimensions of the real environment. The template can then be used with predefined items and/or virtual reproductions of real items in the real environment to virtually represent the real environment. In this process, the template can be resized to more nearly match the real environment.

When the virtual environment is displayed, a user can provide an input to interact with an ad. The interaction can include a more detailed view of the ad, moving an item representing the ad, displaying various information about the ad, or the like. In some embodiments, the information displayed about the ad is displayed within the virtual environment rather than linking to a separate application or web site. When a third party link is present, the virtual environment application 110 may present a portal within the virtual environment to view the information without opening a new application, such as a web browser, to present the information. This may allow the interactions with the ad to be monitored and recorded by the virtual environment application 110.

In some embodiments, the virtual environment application 110 may provide a sales portal for purchasing items advertised within the virtual environment. The payment portal may allow one or more items to be selected, a payment method selected, and the purchase completed from within the virtual environment. In some embodiments, a user account (e.g., a wireless service account, an internet service account, etc.) associated with the user equipment 101 may be used to complete the purchase. When the purchase transaction is conducted from within the virtual environment, the purchase information including the identification of the purchased item, the cost, the shipping information, and the like can be included in the interaction information, which can be stored locally on the user equipment 101 and/or transmitted to a network component.

When the virtual environment is closed, for example when an internet session is ended and/or the application is closed, the virtual environment application 110 may cease rendering the virtual environment. The information associated with the virtual environment can be saved (e.g., in the ad history store 123). At a subsequent time, the virtual environment application 110 can be reinitiated to render the virtual environment. When the virtual environment application 110 is restarted, either locally or remotely, the virtual environment can be recreated. The resulting virtual environment can be the same virtual environment that was previously displayed or a new virtual environment. When the virtual environment is the same, the virtual environment application 110 may access the saved virtual environment and use the saved information to render the same or a similar virtual environment. When a new virtual environment is rendered, the policies and rules may be used to select a template for the virtual environment and render the virtual environment.

When the virtual environment is regenerated, one or more of the ads can remain the same or be exchanged with new ads using the ad selection process described above. When the policies and rules are applied to the ad selection, the ads may change based on the interaction information generated by the previous rendering of the virtual environment. As the integration information is updated with each session of the virtual environment, the virtual environment and the ads presented therein may be tailored for a user. This may provide better interactions with the virtual environment and a greater chance of selling an item to the user. The feedback mechanism may be used with both the theme/template of the virtual environment as well as the selection of ads presented in the ad locations.

Figure 3:
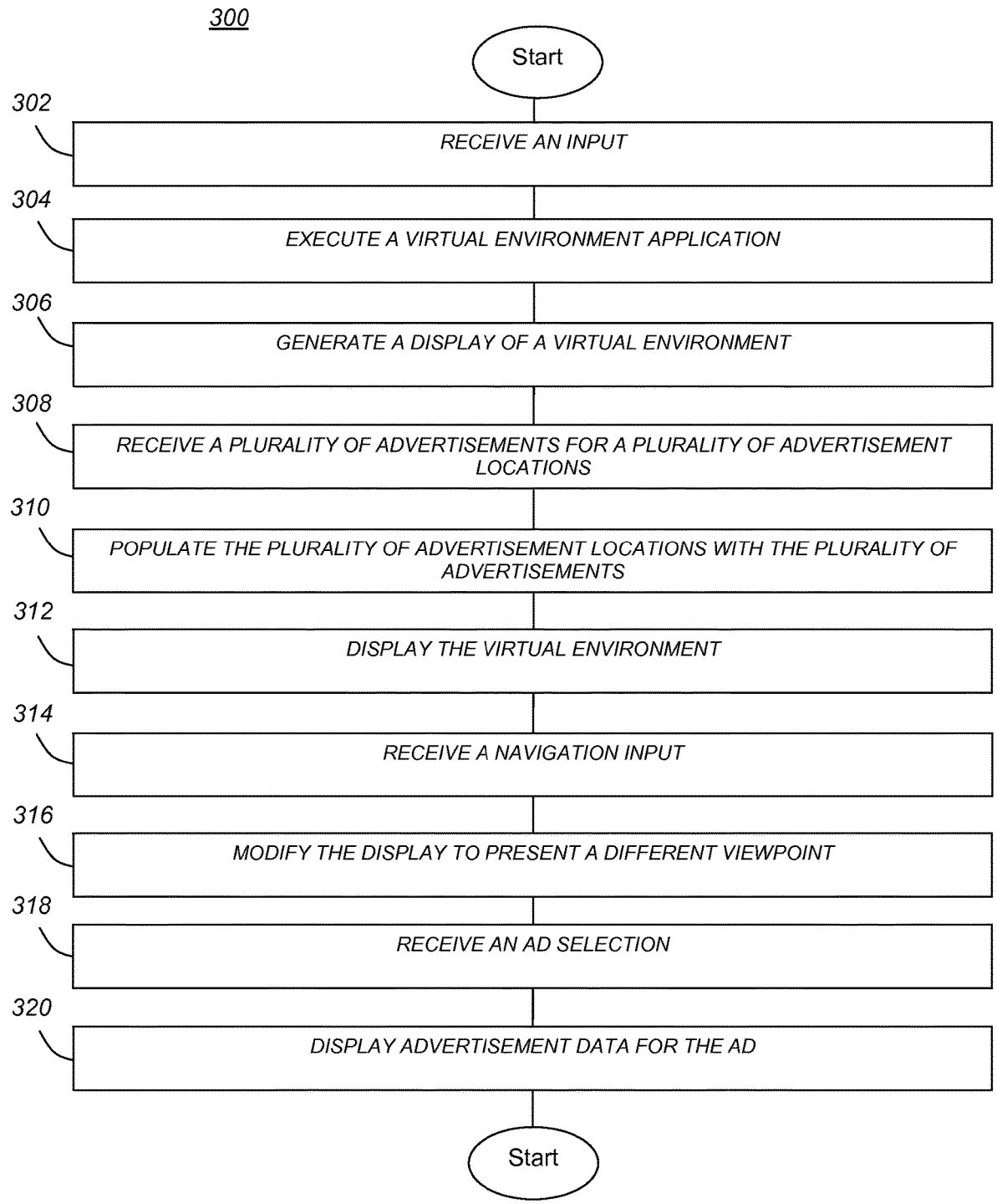
FIG. 3 is a flow chart of a method according to an embodiment of the disclosure.

Turning now to FIG. 3, an embodiment of a method 300 for providing a virtual environment is described. At step 302, an input can be received on the user equipment 101. The input can comprise a selection of the virtual environment application 110. For example, the virtual environment application can be a stand-alone application that executes locally or remotely to generate the virtual environment. In some embodiments, the input may comprise a selection of a different application such as a web browser, a web page in a web browser, a link in a web page, or the like. In response to selecting the application, link, or the like, the virtual environment can be generated to present advertisements before or during the display of the requested information.

At step 304, the virtual environment application can be executed in response to the input. In an embodiment, the virtual environment application 110 may execute on the processor 104. In some embodiments, the virtual environment application may execute on a processor associated with a component that is remote from the user equipment 101. In this embodiment, the resulting virtual environment can be provided over a network connection to the user equipment 101 from the remote processor.

At step 306, the display of the virtual environment can be generated. In an embodiment, the virtual environment application 110 executing on the processor 104 can generate the display of the virtual environment. The virtual environment can comprise a plurality of advertisement locations that define the positions of the ads placed within the virtual environment by a plurality of advertisement providers.

A plurality of ads can be received by the virtual environment application in step 308. The plurality of ads can be received from a plurality of advertisement providers. In some embodiments, an ad mediation platform 122 within the network and/or an ad manager 112 on the user equipment 101 can mediate the receipt of the ads for use with the virtual environment. The ads can be selected based on any of the considerations described herein including interaction information, profile information, policy and rules, ad history information, ad themes and/or template information, or the like. In some embodiments, the ads can be received over the network 120 from one or more ad servers 124, 129 and/or from an ad cache 114 maintained on the user equipment 101. The choice of the location of the ads may be based on the location of the execution of the virtual environment application, the type of network connection, and the like.

At step 310, the advertisement locations within the virtual environment can be populated with the ads. The placement of the ads in the advertisement locations can be based on various rules as described herein. For example, a bidding process may be used to select a location for the ads within the virtual environment. In some embodiments, various interaction information, template definitions and the like can be used during the population of the advertisement locations with the ads. For example, a template may comprise a kitchen setting, and the template may define certain ad locations for specific types of ads. As a specific example, an advertisement location may be designated as an appliance location where only advertisements for appliances or a specific appliance (e.g., a refrigerator, an oven, etc.) can be placed.

At step 312, the virtual environment can be displayed on the display of the user equipment 101. The display may include both the virtual environment as well as the plurality of advertisements that are placed within the virtual environment. The display can include a full screen display or a partial screen display. For example, when a stand-alone virtual environment application 110 is used to generate the display, the virtual environment may appear on the entire or substantially the entire display area of the user equipment 101. When the virtual environment appears as an ad, the virtual environment may appear only on a portion of a display. For example, the virtual environment may appear in a banner advertisement, a side bar, or as a predefined advertisement space within a web page.

At step 314, a navigation input can be received at the user equipment. In step 316, the navigation input may cause the viewpoint of the virtual environment to change, which may represent a movement within the virtual environment. The movement within the virtual environment may allow a user to explore the virtual environment and interact with any of the plurality of ads. In addition to the ads, additional items or objects may also be present in the virtual environment. As the navigation input or inputs are received, the inputs can be recorded as interaction information. For example, the interaction information may indicate that a user explored an environment (e.g., traversing through a maze-like environment) prior to interacting with any ads. This information may provide feedback on the extent of the involvement of the user with the virtual environment.

In step 318, an ad selection input can be received on the user equipment 101. The ad selection input can include a selection of an ad in an advertisement location. The ad selection input can include any of a variety of inputs including a selection of the ad, an interaction with the ad, or the like. When the ad selection input is received, the input or inputs can be recorded as part of the interaction information. The selection input can also be used to charge an advertisement provider. For example, the interaction information comprising the selection input can be communicated back to a network component such as the ad mediation platform 122 where the information indicating that the ad has been selected can be used to charge the advertisement provider.

In step 320, advertisement data for the ad can be displayed on the display of the user equipment 101. The ad information can be displayed in a number of ways. The advertisement data can be displayed within the virtual environment, within a separate window on the user equipment 101, and/or by opening a different application to view the advertisement data. For example, the advertisement data may follow a link to a website, open a browser window, and display information for the ad. In some embodiment, the advertisement information may be displayed within the virtual environment, which may allow for the continued monitoring of the interaction between the user and the ad. In an embodiment, any of the initial input, the navigation input(s), the selection input(s), and/or the identification of the ad can be stored in the interaction information, including any interaction information occurring during or after the advertisement information is presented on the display.

In some embodiments, the interaction information can be used to indicate a history of the interactions between the user and the virtual environment. This information can be used to refine the type of virtual environment presented and/or the ads presented in the advertisement locations. In this embodiment, the interaction information can be stored in a memory. In addition to the interaction information, a configuration of the virtual environment presented to a user can be stored in a history store in the memory when the virtual environment is closed. This may include each version of the virtual environment displayed on the display. Once the virtual environment is no longer displayed, the display can be regenerated based on the information in the history store. The regenerated virtual environment can also be based on the past interaction information. This may result in a different theme or template being selected for the virtual environment as well as different ads being selected to populate the advertisement locations within the virtual environment. For example, when the ads are selected based on at least one of the input, the navigation input, the selection input, or an identification of the ad, the updated information resulting from a first display of the at least one of the input, the navigation input, the selection input, or an identification of the ad may change in a subsequent display of the virtual environment based on the updated information.

Within the virtual environment, a user can complete a purchase transaction. In an embodiment, the method may also include receiving a purchase input for an item advertised in a selected ad on the user equipment 101. The purchase input may result in a payment screen being generated that allows a user to enter payment information for the item. The virtual environment application 110 may then facilitate the purchase transaction with various network components such as a billing system. This process may allow the purchase transaction to proceed through the virtual environment application 110, which can record the purchase information and include the information in the interaction information. In addition, the virtual environment application 110 can route the purchase through the communication provider network and servers, which allow the communication provider to maintain control over the purchase and the context in which the purchase occurs. In some embodiments, a customer account or billing information can be used to complete the transaction, which may result in a larger purchase conversion (e.g., the percentage of transactions that are completed relative to those that are initiated) due to the simplified purchase process.

Figure 4:
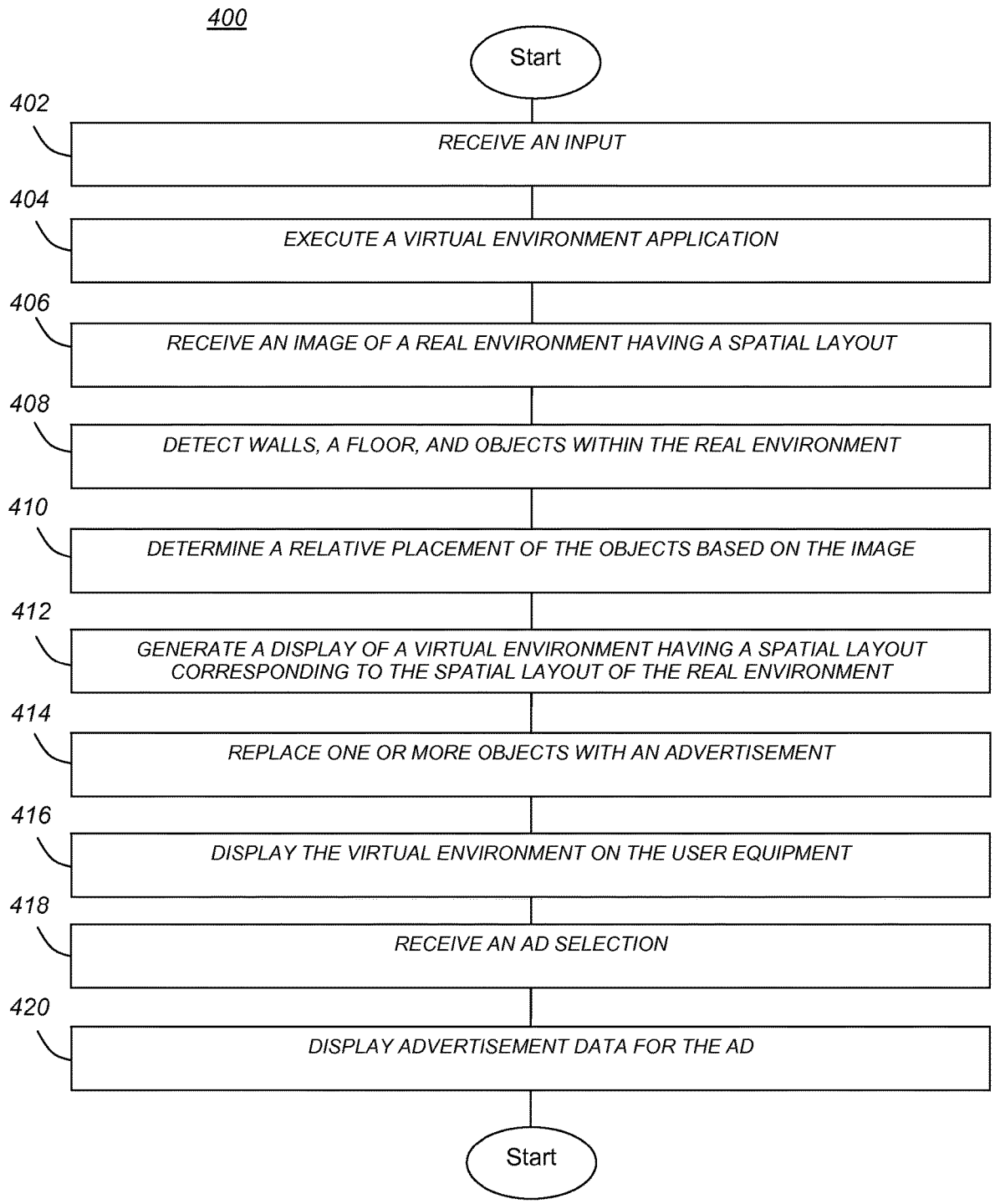
FIG. 4 is a flow chart of another method according to an embodiment of the disclosure.

An embodiment of a method 400 for generating a virtual environment that reproduces a real environment is illustrated in FIG. 4. At step 402, an input can be received on the user equipment 101. The input can comprise a selection of the virtual environment application 110. In some embodiments, the input may comprise a selection of different application such as a web browser, a web page in a web browser, a link in a web page, or the like. At step 404, the virtual environment application can be executed in response to the input. In an embodiment, the virtual environment application 110 may execute on the processor 104. In some embodiments, the virtual environment application may execute on a processor associated with a component that is remote from the user equipment 101.

A user may desire to have their own environment or any other environment reproduced in the virtual environment. In order to reproduce a real environment, an image of a real environment can be provided. At step 406, the image can be received by the virtual environment application 110. The image can contain a spatial layout having walls, a floor, a ceiling, various objects, and the like. At step 408, image recognition routines can be carried out by the virtual environment application 110 to detect the items in the image. For example, the image recognition routines may recognize one or more walls, the floor, and a plurality of objects within the image. The recognized items can then be correlated with their relative positions within the image to determine a relative placement of the plurality of objects within the real environment in step 410.

In an embodiment, the relative placement of the plurality of objects can be determined based on various rules. The rules can be stored in a rules store in the memory. The rules may include scaling rules that include both scaling references as well as scaling rules based on reproduced objects within the virtual environment. Initially, the scaling rules can be applied to each recognized object. The application of the scaling rules may result in a determination of an approximate distance of the object from the viewpoint of the image device. This may be relative to the other objects in the image. For example, a wall outlet cover may have a standardized size. The image recognition routines may recognize the object as a wall outlet cover. The size of the wall outlet cover can then be determined. By using the scaling rules relative to another object, the relative distance between the wall outlet cover and the other object can be determined. This process can be repeated for each recognized object to construct a relative layout of the real environment being virtually reproduced.

In step 412, a display of the virtual environment can be generated by the virtual environment application 110. The spatial layout of the virtual environment generated can correspond to the spatial layout of the real environment. In this context, the spatial layout refers to the general arrangement of the walls, floor, and/or ceiling (if present). The items recognized using the image recognition routines can also be virtually reproduced and inserted into the virtual environment. The items can be placed in approximately the same locations as they appear in the image of the real environment. In some embodiments, placement rules can be stored in the memory. The placement rules may specify what types of items can be included in the virtual environment and where they can be placed. This may allow for the appropriate number of advertisement locations while filtering out all of the potential items that can be recognized by the image recognition routines.

In some embodiments, a template approach may be used to generate the display of the virtual environment. In this embodiment, the relative layout of the walls and the floor can be determined using the process described above. The relative dimensions of the walls and floor, as well as other items in the real environment, can be determined. The relative layout can then be compared to a plurality of virtual environment templates. The templates may have predefined layouts for walls, floors, items, and/or advertisement locations. Various criteria such as the relative dimensions of rooms, relative room openings, and the like can be compared to the relative layout determined from the supplied image. A template most closely matching the relative layout can then be selected from the plurality of virtual environment templates. The template can then be optionally scaled based on the relative dimensions determined from the image. For example, the relative dimensions of a room can be modified to match the dimensions recognized from the image. The template, as potentially modified by the scaling, can then be used to generate the display of the virtual environment. One or more objects can then be populated within the virtual environment to complete the display.

At step 414, one or more of the plurality of objects or items reproduced in the virtual environment can be replaced with an advertisement. For example, the virtual environment application 110 may remove a virtually reproduced television on a wall and replace the television with an advertisement. In some embodiments, replacing the object with an ad can include using replacement rules stored in a policy store in the memory. In this embodiment, the replacement rules can be retrieved from the memory and applied to each item in the virtual environment. The replacement rules may define which types of ads, the subject matter of the ads, and the like can be used to replace different types of items. For example, a virtually reproduced television mounted on a wall may be replaced with an ad for a television, a painting, a poster, an image, or the like, but may not generally be replaced with a three-dimension image of a car, which may be out of place when placed on a wall in place of the television. When the replacement rules are applied to a virtually reproduced item, an ad may be used to replace the item when the replacement rules are satisfied.

At step 416, the virtual environment can be displayed on the user equipment once the real environment has been reproduced in the virtual environment. A user may then interact with the virtual environment as described herein. For example, an ad selection input can be received for an ad in step 418, and advertisement data for the ad can be displayed in step 420.

While described as using a single image to recreate the real environment, a series of images or a video may also be used. A greater number of images may allow for a greater portion of the real environment to be virtually reproduced. Further, any of the types of interaction data can be recorded, including the creation of the customized virtual environment, which indicate a high level of interaction with the virtual environment application.

Figure 5:
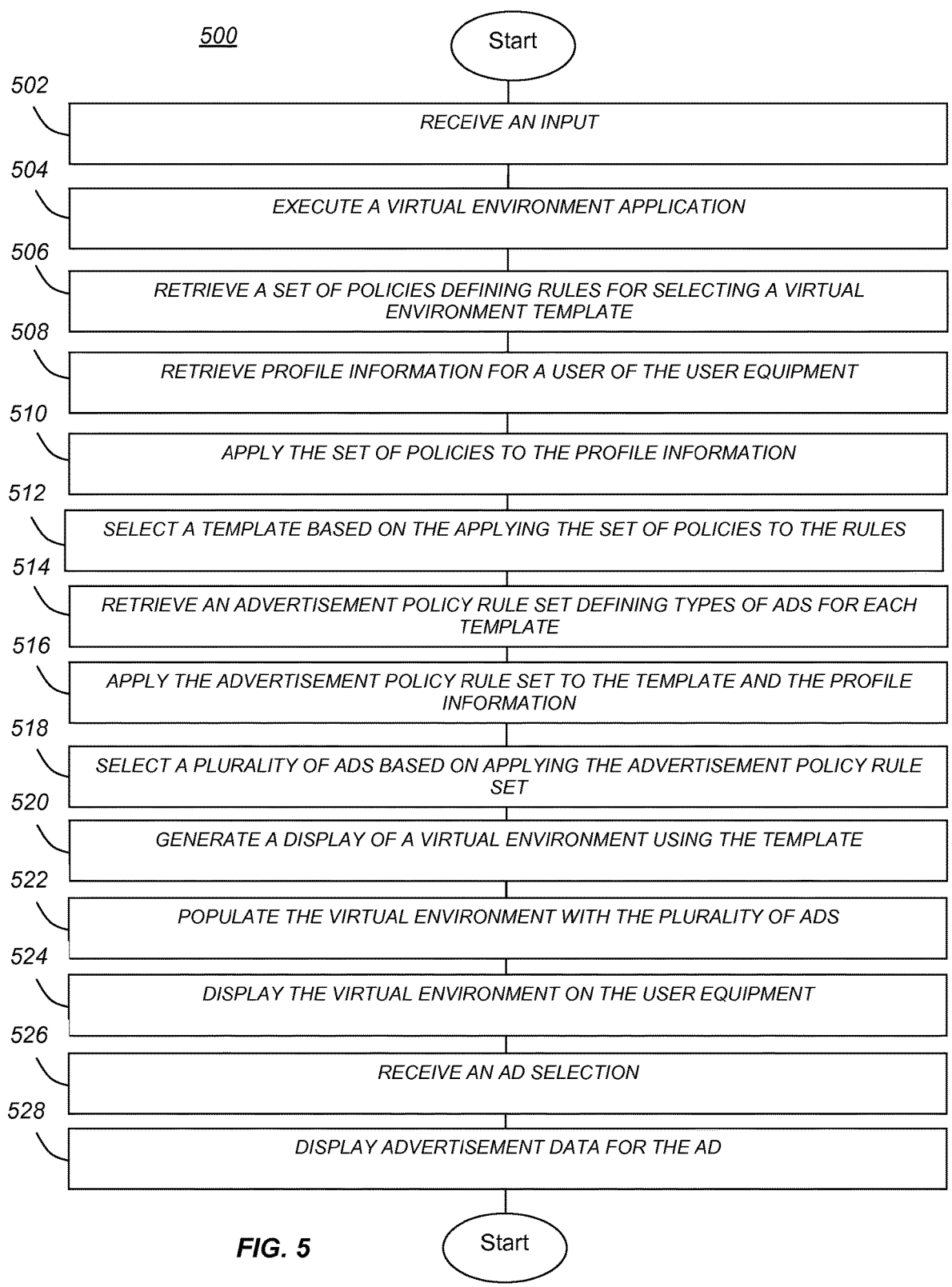
FIG. 5 is a flow chart of still another method according to an embodiment of the disclosure.

In some embodiments, templates can be used to create the virtual environment. A method 500 for providing a virtual environment using a template is shown in FIG. 5. At step 502, an input can be received on the user equipment 101. The input can comprise a selection of the virtual environment application 110. In some embodiments, the input may comprise a selection of a different application such as a web browser, a web page in a web browser, a link in a web page, or the like. At step 504, the virtual environment application can be executed in response to the input. In an embodiment, the virtual environment application 110 may execute on the processor 104. In some embodiments, the virtual environment application may execute on a processor associated with a component that is remote from the user equipment 101.

At step 506, a set of policies or rules can be retrieved by the virtual environment application 110 from a policy store portion of the memory. The set of policies can define rules for selecting a virtual environment template. The set of policies may utilize information from the user profile in the profile store 116 and/or the profile data store 126, previous interaction information in the interaction store 115. In an embodiment, the profile information can be retrieved by the virtual environment application 110 from a profile store portion of the memory at step 508. The profile store can be on the user equipment 101 and/or on a network connected element such as the profile data store 126.

At step 510, the set of policies can be applied to the profile information. A template can then be selected from a plurality of virtual environment templates based on the results of applying the set of policies to the profile information at step 512. For example, the profile information may indicate that the user is a twenty six year old male. The set of policies may define a range of templates that are suitable for the user in this circumstance and exclude certain themes. For example, a children's themed template having cartoons may not be suitable for the twenty six year old male user. Other profile information may be used to optimize the selection of the template.

In some embodiments, the interaction information may be used to further refine the selection of the template. In this embodiment, interaction information can be retrieved by the virtual environment application 110 from an interaction store 115 in the memory. The set of policies can be applied to the interaction information and the template can be selected based, at least in part, on the application of the set of policies to the interaction information. For example, the interaction information may indicate that the user has recently visited car manufacturer websites and car dealer websites more than five times. The set of policies may indicate that a car themed template should be selected when a user has visited a vehicle manufacturer or dealer website more than three times in the last month. In this instance, the application of the set of policies with the interaction information may indicate that a car themed template should be considered. Other templates may also be selected based on the set of policies, and the set of policies can include a scoring mechanism or refined selection criteria when a plurality of templates could be selected for a user.

In step 514, an advertisement policy rule set can be retrieved by the virtual environment application 110 from a policy store 117 in the memory 106. The advertisement policy rule set can define a relationship between one or more types of ads and the template and/or the profile information. As with the template selection, the advertisement policy rule set may be used to select the ads for use with the virtual environment. The advertisement policy rule set can be applied to the template and the profile information in step 516. A plurality of ads can then be selected based on applying the set of policies to the template and the profile information in step 518. For example, the template information may describe the number of ads available, where they can be placed, and the type of ads that can be placed in each advertisement location. At step 520, the display of the virtual environment can be generated using the template.

In an embodiment, the templates define a spatial layout of the virtual environment. The templates can also define the advertisement locations within the virtual environment. When the plurality of ads is selected, the template information can be used to populate the ads into the appropriate advertisement locations within the virtual environment in step 522. The virtual environment can then be displayed on the user equipment in step 524.

When the virtual environment is displayed on the user equipment, the user can navigate through the virtual environment and/or select various ads or items to interact with in the virtual environment. At step 526, an ad selection input for an ad can be received on the user equipment 101. In response to the ad selection input, advertisement data for the ad can be displayed at step 528.

The resulting configuration of the virtual environment can be stored in a history portion of the memory for use with additional renderings of the virtual environment. In this embodiment, the configuration of the virtual environment can be stored along with an identification of the template. When the virtual environment is no longer being displayed or generated, a second input can be received indicating that the virtual environment should be regenerated. The display of the virtual environment can then be regenerated by retrieving the identity of the template and regenerating the virtual environment using the template. The template can then be modified using the saved configuration information. For example, specific ads and the ad placements can be retrieved and used to regenerate a previous virtual environment. In some embodiments, any changes made by a user within the virtual environment can be saved in the configuration information. These changes can then be used when the virtual environment is regenerated.

In some embodiments, when the virtual environment is regenerated, the ad selection process can be repeated prior to populating the template with the ads. Since the ad selection can be based on the prior interaction information, which may be updated based on the previous interactions, the plurality of ads used to populate the template may be different. In some embodiments, any changes in the interaction information may also be taken into account in selecting a template, which can occur each time the virtual environment application is selected. In this instance, the template itself may change between subsequent generations of the display of the virtual environment.

Figure 6:
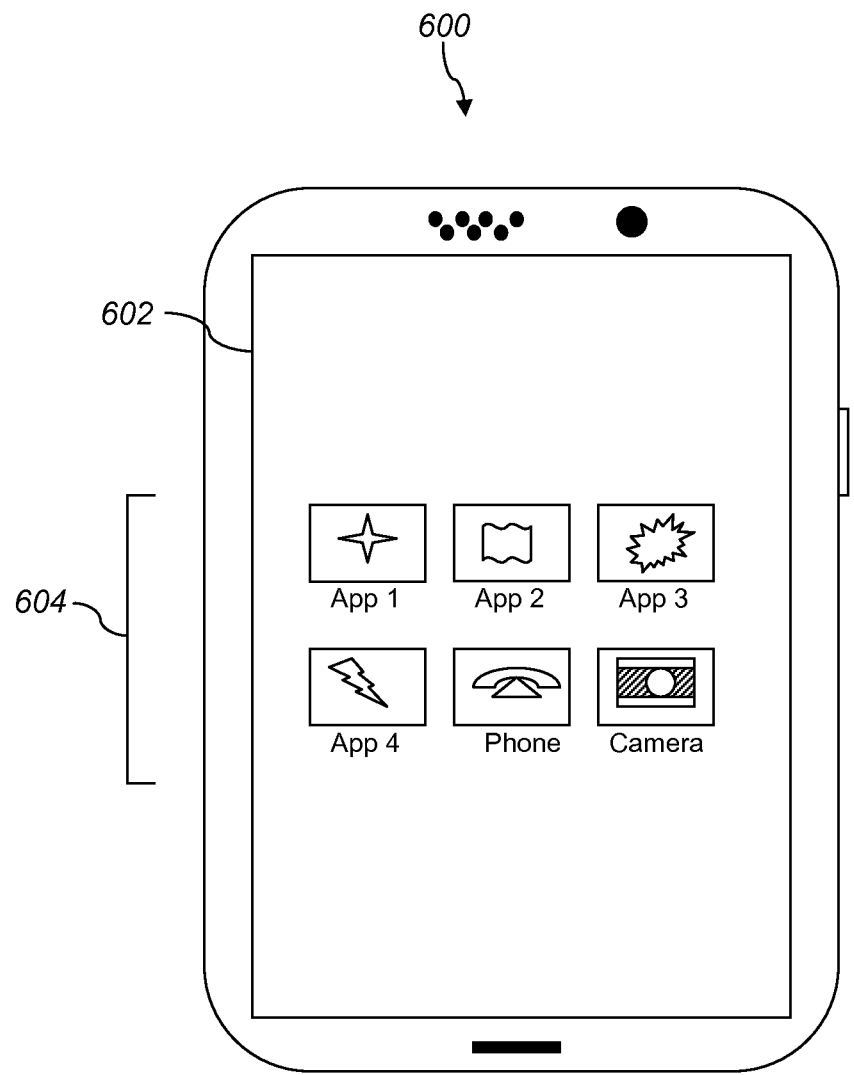
FIG. 6 is an illustration of a user equipment according to an embodiment of the disclosure.

FIG. 6 depicts the user equipment (UE) 600, which is operable for implementing aspects of the present disclosure, but the present disclosure should not be limited to these implementations. Though illustrated as a mobile phone, the UE 600 may take various forms including a wireless handset, a pager, a personal digital assistant (PDA), a gaming device, or a media player. The UE 600 includes a touch-screen display 602 having a touch-sensitive surface for input by a user. A small number of application icons 604 are illustrated within the touch screen display 602. It is understood that in different embodiments, any number of application icons 604 may be presented in the touch screen display 602. In some embodiments of the UE 600, a user may be able to download and install additional applications on the UE 600, and an icon associated with such downloaded and installed applications may be added to the touch screen display 602 or to an alternative screen. The UE 600 may have other components such as electro-mechanical switches, speakers, camera lenses, microphones, input and/or output connectors, and other components as are well known in the art. The UE 600 may present options for the user to select, controls for the user to actuate, and/or cursors or other indicators for the user to direct. The UE 600 may further accept data entry from the user, including numbers to dial or various parameter values for configuring the operation of the handset. The UE 600 may further execute one or more software or firmware applications in response to user commands. These applications may configure the UE 600 to perform various customized functions in response to user interaction. Additionally, the UE 600 may be programmed and/or configured over-the-air, for example from a wireless base station, a wireless access point, or a peer UE 600. The UE 600 may execute a web browser application which enables the touch screen display 602 to show a web page. The web page may be obtained via wireless communications with an eNB, a wireless network access node, a peer UE 600 or any other wireless communication network or system.

Figure 7:
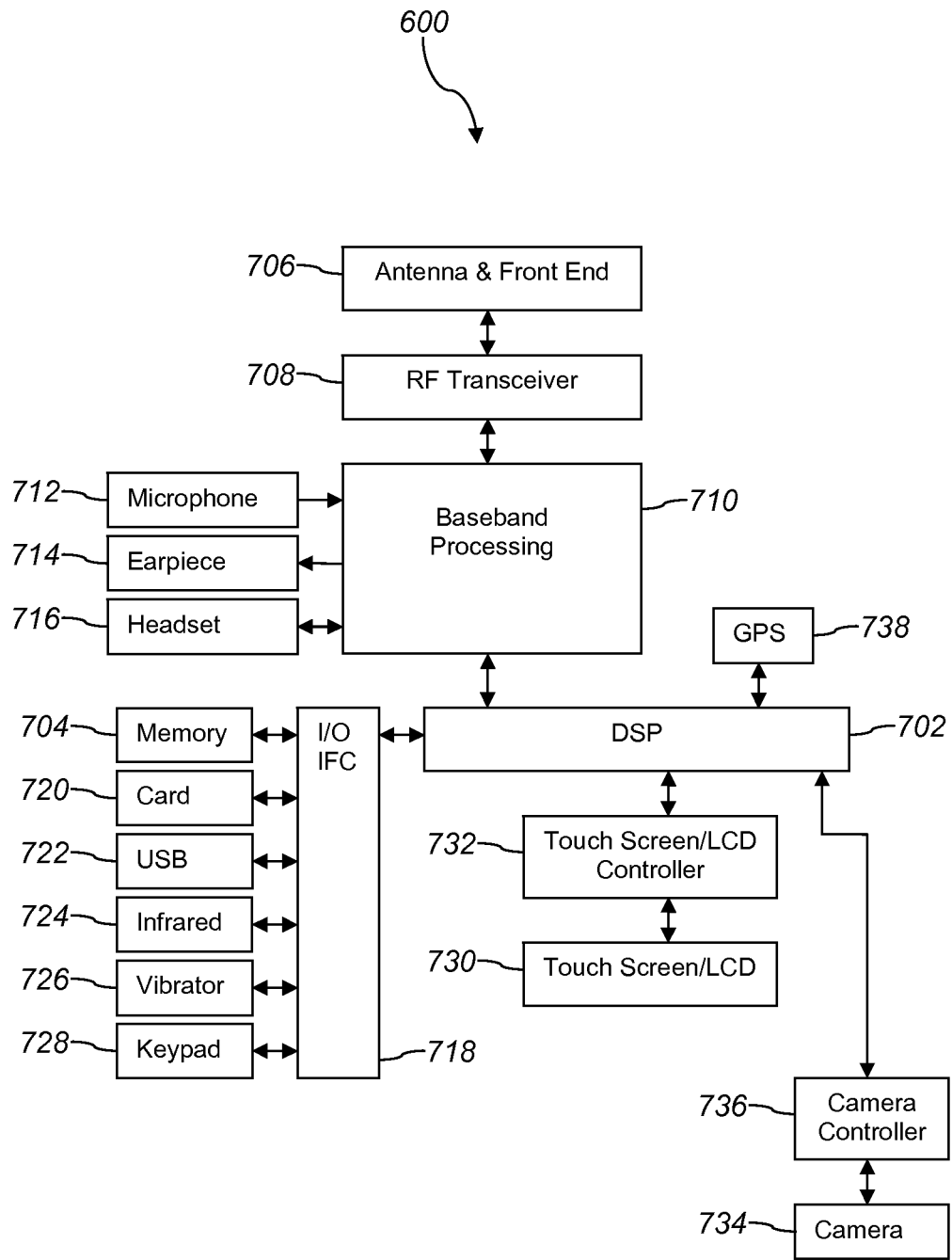
FIG. 7 is a block diagram of a user equipment according to an embodiment of the disclosure.

FIG. 7 shows a block diagram of the UE 600. While a variety of known components of handsets are depicted, in an embodiment a subset of the listed components and/or additional components not listed may be included in the UE 600. The UE 600 includes a digital signal processor (DSP) 702 and a memory 704. As shown, the UE 600 may further include an antenna and front end unit 706, a radio frequency (RF) transceiver 708, a baseband processing unit 710, a microphone 712, an earpiece speaker 714, a headset port 716, an input/output interface 718, a removable memory card 720, a universal serial bus (USB) port 722, an infrared port 724, a vibrator 726, one or more electro-mechanical switches 728, a touch screen liquid crystal display (LCD) with a touch screen display 730, a touch screen/LCD controller 732, a camera 734, a camera controller 736, and a global positioning system (GPS) receiver 738. In an embodiment, the UE 600 may include another kind of display that does not provide a touch sensitive screen. In an embodiment, the UE 600 may include both the touch screen display 730 and additional display component that does not provide a touch sensitive screen. In an embodiment, the DSP 702 may communicate directly with the memory 704 without passing through the input/output interface 718. Additionally, in an embodiment, the UE 600 may comprise other peripheral devices that provide other functionality.

The DSP 702 or some other form of controller or central processing unit operates to control the various components of the UE 600 in accordance with embedded software or firmware stored in memory 704 or stored in memory contained within the DSP 702 itself. In addition to the embedded software or firmware, the DSP 702 may execute other applications stored in the memory 704 or made available via information carrier media such as portable data storage media like the removable memory card 720 or via wired or wireless network communications. The application software may comprise a compiled set of machine-readable instructions that configure the DSP 702 to provide the desired functionality, or the application software may be high-level software instructions to be processed by an interpreter or compiler to indirectly configure the DSP 702.

The DSP 702 may communicate with a wireless network via the analog baseband processing unit 710. In some embodiments, the communication may provide Internet connectivity, enabling a user to gain access to content on the Internet and to send and receive e-mail or text messages. The input/output interface 718 interconnects the DSP 702 and various memories and interfaces. The memory 704 and the removable memory card 720 may provide software and data to configure the operation of the DSP 702. Among the interfaces may be the USB port 722 and the infrared port 724. The USB port 722 may enable the UE 600 to function as a peripheral device to exchange information with a personal computer or other computer system. The infrared port 724 and other optional ports such as a Bluetooth® interface or an IEEE 802.11 compliant wireless interface may enable the UE 600 to communicate wirelessly with other nearby handsets and/or wireless base stations. In an embodiment, the UE 600 may comprise a near field communication (NFC) transceiver. The NFC transceiver may be used to complete payment transactions with point-of-sale terminals or other communications exchanges. In an embodiment, the UE 600 may comprise a radio frequency identify (RFID) reader and/or writer device.

The switches 728 may couple to the DSP 702 via the input/output interface 718 to provide one mechanism for the user to provide input to the UE 600. Alternatively, one or more of the switches 728 may be coupled to a motherboard of the UE 600 and/or to components of the UE 600 via a different path (e.g., not via the input/output interface 718), for example coupled to a power control circuit (power button) of the UE 600. The touch screen display 730 is another input mechanism, which further displays text and/or graphics to the user. The touch screen LCD controller 732 couples the DSP 702 to the touch screen display 730. The GPS receiver 738 is coupled to the DSP 702 to decode global positioning system signals, thereby enabling the UE 600 to determine its position.

Figure 8A:
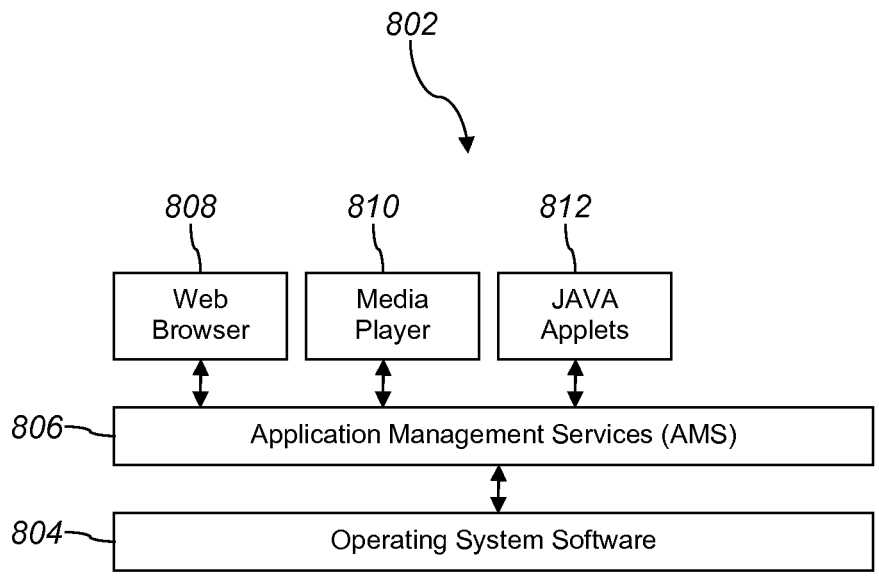
FIGS. 8A and 8B are block diagrams of software architecture for a user equipment according to an embodiment of the disclosure.

FIG. 8A illustrates a software environment 802 that may be implemented by the DSP 702. The DSP 702 executes operating system software 804 that provides a platform from which the rest of the software operates. The operating system software 804 may provide a variety of drivers for the handset hardware with standardized interfaces that are accessible to application software. The operating system software 804 may be coupled to and interact with application management services (AMS) 806 that transfer control between applications running on the UE 800. Also shown in FIG. 8A are a web browser application 808, a media player application 810, and JAVA applets 812. The web browser application 808 may be executed by the UE 600 to browse content and/or the Internet, for example when the UE 600 is coupled to a network via a wireless link. The web browser application 808 may permit a user to enter information into forms and select links to retrieve and view web pages. The media player application 810 may be executed by the UE 800 to play audio or audiovisual media. The JAVA applets 812 may be executed by the UE 800 to provide a variety of functionality including games, utilities, and other functionality.

Figure 8B:
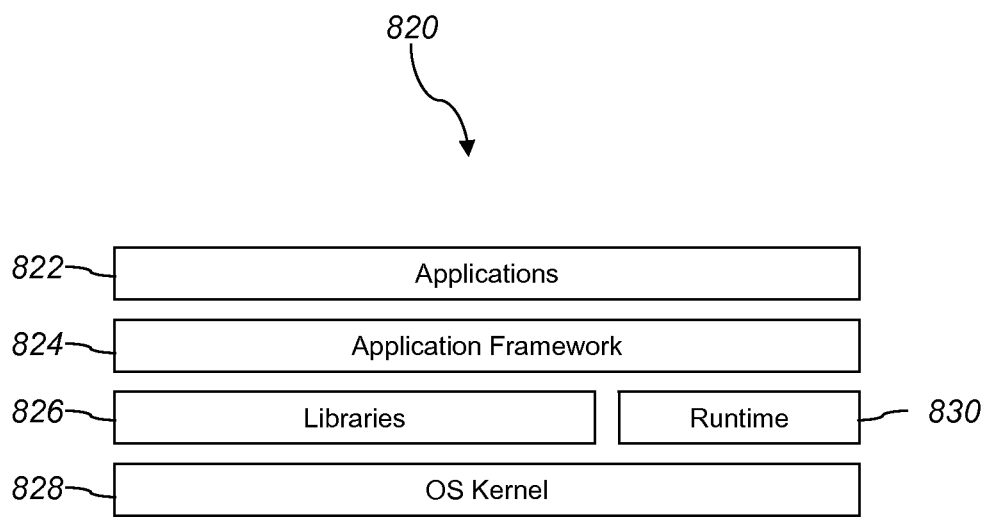

FIG. 8B illustrates an alternative software environment 820 that may be implemented by the DSP 702. The DSP 702 executes operating system kernel (OS kernel) 828 and an execution runtime 830. The DSP 702 executes applications 822 that may execute in the execution runtime 830 and may rely upon services provided by the application framework 824. Applications 822 and the application framework 824 may rely upon functionality provided via the libraries 826.

Figure 9:
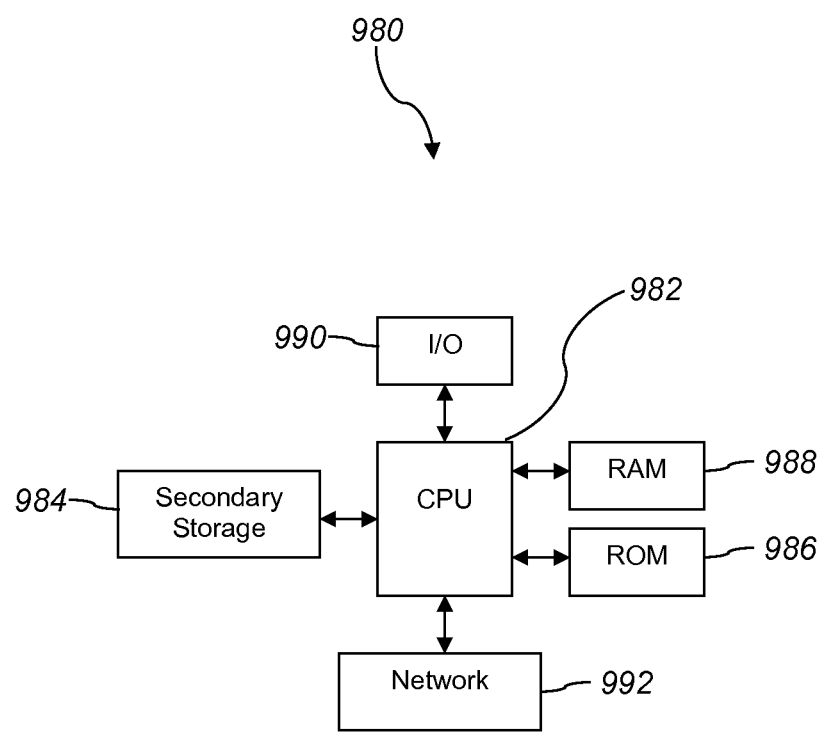
FIG. 9 illustrates an exemplary computer system suitable for implementing the several embodiments of the disclosure.

FIG. 9 illustrates a computer system 980 suitable for implementing one or more embodiments disclosed herein. For example, the computer system 980 may be used to implement any of the network components. The computer system 980 includes a processor 982 (which may be referred to as a central processor unit or CPU) that is in communication with memory devices including secondary storage 984, read only memory (ROM) 986, random access memory (RAM) 988, input/output (I/O) devices 990, and network connectivity devices 992. The processor 982 may be implemented as one or more CPU chips.

It is understood that by programming and/or loading executable instructions onto the computer system 980, at least one of the CPU 982, the RAM 988, and the ROM 986 are changed, transforming the computer system 980 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 980 is turned on or booted, the CPU 982 may execute a computer program or application. For example, the CPU 982 may execute software or firmware stored in the ROM 986 or stored in the RAM 988. In some cases, on boot and/or when the application is initiated, the CPU 982 may copy the application or portions of the application from the secondary storage 984 to the RAM 988 or to memory space within the CPU 982 itself, and the CPU 982 may then execute instructions that the application is comprised of. In some cases, the CPU 982 may copy the application or portions of the application from memory accessed via the network connectivity devices 992 or via the I/O devices 990 to the RAM 988 or to memory space within the CPU 982, and the CPU 982 may then execute instructions that the application is comprised of. During execution, an application may load instructions into the CPU 982, for example load some of the instructions of the application into a cache of the CPU 982. In some contexts, an application that is executed may be said to configure the CPU 982 to do something, e.g., to configure the CPU 982 to perform the function or functions promoted by the subject application. When the CPU 982 is configured in this way by the application, the CPU 982 becomes a specific purpose computer or a specific purpose machine.

The secondary storage 984 is typically comprised of one or more disk drives or tape drives and is used for non-volatile storage of data and as an over-flow data storage device if RAM 988 is not large enough to hold all working data. Secondary storage 984 may be used to store programs which are loaded into RAM 988 when such programs are selected for execution. The ROM 986 is used to store instructions and perhaps data which are read during program execution. ROM 986 is a non-volatile memory device which typically has a small memory capacity relative to the larger memory capacity of secondary storage 984. The RAM 988 is used to store volatile data and perhaps to store instructions. Access to both ROM 986 and RAM 988 is typically faster than to secondary storage 984. The secondary storage 984, the RAM 988, and/or the ROM 986 may be referred to in some contexts as computer readable storage media and/or non-transitory computer readable media.

I/O devices 990 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 992 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 992 may enable the processor 982 to communicate with the Internet or one or more intranets. With such a network connection, it is contemplated that the processor 982 might receive information from the network, or might output information to the network in the course of performing the above-described method steps. Such information, which is often represented as a sequence of instructions to be executed using processor 982, may be received from and outputted to the network, for example, in the form of a computer data signal embodied in a carrier wave.

Such information, which may include data or instructions to be executed using processor 982 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 982 executes instructions, codes, computer programs, scripts which it accesses from hard disk, floppy disk, optical disk (these various disk based systems may all be considered secondary storage 984), flash drive, ROM 986, RAM 988, or the network connectivity devices 992. While only one processor 982 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 984, for example, hard drives, floppy disks, optical disks, and/or other device, the ROM 986, and/or the RAM 988 may be referred to in some contexts as non-transitory instructions and/or non-transitory information.

In an embodiment, the computer system 980 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 980 to provide the functionality of a number of servers that is not directly bound to the number of computers in the computer system 980. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 980, at least portions of the contents of the computer program product to the secondary storage 984, to the ROM 986, to the RAM 988, and/or to other non-volatile memory and volatile memory of the computer system 980. The processor 982 may process the executable instructions and/or data structures in part by directly accessing the computer program product, for example by reading from a CD-ROM disk inserted into a disk drive peripheral of the computer system 980. Alternatively, the processor 982 may process the executable instructions and/or data structures by remotely accessing the computer program product, for example by downloading the executable instructions and/or data structures from a remote server through the network connectivity devices 992. The computer program product may comprise instructions that promote the loading and/or copying of data, data structures, files, and/or executable instructions to the secondary storage 984, to the ROM 986, to the RAM 988, and/or to other non-volatile memory and volatile memory of the computer system 980.

In some contexts, the secondary storage 984, the ROM 986, and the RAM 988 may be referred to as a non-transitory computer readable medium or a computer readable storage media. A dynamic RAM embodiment of the RAM 988, likewise, may be referred to as a non-transitory computer readable medium in that while the dynamic RAM receives electrical power and is operated in accordance with its design, for example during a period of time during which the computer system 980 is turned on and operational, the dynamic RAM stores information that is written to it. Similarly, the processor 982 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for creating and displaying a virtual environment, the method comprising:
   receiving an input on a user equipment;
   executing, by a processor, a virtual environment application in response to receiving the input;
   retrieving, by the virtual environment application from a policy store portion of a memory, a set of policies, wherein the set of policies define rules for selecting a virtual environment template;

retrieving, by the virtual environment application from a profile store portion of the memory, profile information for a user of the user equipment;

applying the set of policies to the profile information;

selecting a template from a plurality of virtual environment templates based on applying the set of policies to the profile information;

retrieving, by the virtual environment application from the policy store portion of the memory, an advertisement policy rule set, wherein the advertisement policy rule set defines a relationship between one or more types of advertisements and at least one of the template or the profile information;

applying the advertisement policy rule set to the template and the profile information;

selecting a plurality of advertisements based on applying the advertisement policy rule set to the template and the profile information;

receiving, by the virtual environment application, an image of a real environment, wherein the real environment comprises a spatial layout comprising one or more walls, a floor, and a plurality of objects, and wherein the template is based on the image of the real environment;

detecting, by the virtual environment application, the one or more walls, the floor, and the plurality of objects within the image;

determining a relative placement of the plurality of objects within the real environment based on the image;

generating, by the virtual environment application, a display of a virtual environment, using the template, that simulates the real environment, wherein the template defines a theme for the virtual environment, a type of advertisements for the virtual environment, and at least one location in the virtual environment for placing an advertisement, and wherein a spatial layout of the virtual environment that simulates the real environment corresponds to the spatial layout of the real environment;

populating the virtual environment with the plurality of advertisements, wherein the plurality of advertisements comply with the type of advertisements for the virtual environment as defined by the template, wherein the populating comprises replacing, by the virtual environment application, at least one of the one or more of the plurality of objects with an advertisement within the virtual environment that simulates the real environment, and wherein at least one of the plurality of objects provides a scale reference for determining a size of the advertisement within the virtual environment that simulates the real environment;

displaying, by the virtual environment application, the virtual environment that simulates the real environment on the user equipment;

receiving, at the user equipment, a first selection input for the advertisement within the virtual environment that simulates the real environment;

retaining the user of the user equipment in the virtual environment by presenting advertisement data associated with the advertisement in the virtual environment responsive to receiving the first selection input, wherein to retain the user, the virtual environment application is configured to:
obtain the advertisement data associated with the advertisement from an outside source; and
present the advertisement data in the virtual environment rather than redirecting the user outside of the virtual environment to the outside source, such that interaction by the user with the advertisement data is trackable in the virtual environment by the virtual environment application;

receiving, at the user equipment, a second selection input for another advertisement of the plurality of advertisements;

generating and transmitting, by the user equipment, a message configured to share the virtual environment by causing a second user equipment to display the virtual environment and advertisement data for the another advertisement responsive to the user equipment receiving the second selection input for the another advertisement;

tracking the sharing of the virtual environment and the another advertisement as an interaction with the another advertisement by the user of the user equipment, wherein the interaction describes a billing event for which a provider of the advertisement is charged; and presenting the virtual environment to a user of the second user equipment, retaining the user of the second user equipment in the virtual environment, and tracking interactions with the another advertisement or other elements of the virtual environment by the user of the second user equipment.

2. The method of claim 1, further comprising:
retrieving, by the virtual environment application from an interaction store portion of the memory, interaction information for the user of the user equipment with the virtual environment; and
applying the set of policies to the interaction information, wherein selecting the template from the plurality of virtual environment templates is further based on applying the set of policies to the interaction information.

3. The method of claim 1, wherein the template defines a plurality of advertisement locations, and wherein the plurality of advertisements are populated into the plurality of advertisement locations within the virtual environment.

4. The method of claim 1, further comprising:
storing, in a history portion of the memory, a configuration of the virtual environment and an identity of the template;
ceasing the display of the virtual environment;
regenerating the display of the virtual environment using the identity of the template; and
modifying the template using the stored configuration of the virtual environment.

5. The method of claim 4, wherein the display of the virtual environment comprises a different plurality of advertisements after the modifying, wherein the different plurality of advertisements are selected based on changes between the template and the stored configuration of the virtual environment.

6. The method of claim 3, wherein only a portion of the plurality of advertisement locations are visible in the display of the virtual environment and wherein the method further comprises:
receiving, at the user equipment, a navigation input;
modifying the display of the virtual environment to present a modified display, wherein the modified display comprises a different viewpoint within the virtual environment, wherein the different viewpoint correlates to a movement within the virtual environment, and wherein at least one additional advertisement location of the plurality of advertisement locations is visible in the modified display that is not visible in the display of the virtual environment;

receiving, at the user equipment, an ad selection input for an advertisement in the at least one additional advertisement location after modifying the display; and displaying, on the display of the user equipment, advertisement data for the advertisement in the at least one additional advertisement location.

7. The method of claim 6, further comprising: storing, in an interaction store portion of a memory, at least one of the input, the navigation input, the ad selection input, or an identification of the advertisement in the at least one additional advertisement location.

8. The method of claim 7, wherein receiving the plurality of advertisements is based on an input history in the interaction store portion of the memory.

9. The method of claim 6, wherein the processor is remote from the user equipment, and wherein displaying the display of the virtual environment comprises receiving the display from the remote processor.

10. The method of claim 6, further comprising:
   storing, in a history portion of the memory, a configuration of the virtual environment;
   ceasing the display of the virtual environment; and
   regenerating the display of the virtual environment based on the configuration in the history portion of the memory.

11. The method of claim 10, wherein the display of the virtual environment comprises a different plurality of advertisements after the regenerating, wherein the different plurality of advertisements are selected based on at least one of the input, the navigation input, the selection input for the advertisement, or an identification of the advertisement.

12. The method of claim 6, further comprising:
   receiving, at the user equipment, a purchase input for an item advertised in the advertisement in the at least one additional advertisement location;
   receiving, at the user equipment, payment information for the item; and
   completing a purchase transaction for the item on the user equipment by charging a mobile communication service subscription account, maintained by a mobile communication provider and associated with the user equipment, for an amount defined by the purchase transaction.

13. The method of claim 6, further comprising: sending an indication of the selection input for the advertisement in the at least one additional advertisement location to an ad mediation platform, wherein the ad mediation platform charges an advertisement provider based on the selection input for the advertisement in the at least one additional advertisement location.

14. The method of claim 6, wherein the input comprises a selection of a web page in a web browser, and wherein the method further comprises: displaying the web page in response to receiving the ad selection input.

15. The method of claim 1, wherein determining the relative placement of the plurality of objects comprises:
   retrieving, from the policy store portion of a memory, scaling rules for objects;
   applying the scaling rules to each of the detected plurality of objects; and
   determining a distance of each of the plurality of objects from a viewpoint of the image based on applying the scaling rules.

16. The method of claim 1, wherein replacing at least one of the one or more of the plurality of objects comprises:
   retrieving, from the policy store portion of a memory, replacement rules for advertisements within the virtual environment that simulates the real environment;
   applying the replacement rules to each of the detected plurality of objects;
   determining that an object of the detected plurality of objects satisfies the replacement rules; and
   replacing at least one of the one or more of the plurality of objects based on determining that the object satisfies the replacement rules.

* * * * *